US012696056B2

(12) United States Patent
Bhangu

(10) Patent No.: US 12,696,056 B2
(45) Date of Patent: Jul. 28, 2026

(54) SYSTEM AND METHOD FOR IMPLEMENTING SENSING AND COMMUNICATION FUNCTION IN A TELECOMMUNICATION SYSTEM

(71) Applicant: RAKUTEN SYMPHONY, INC., Tokyo (JP)

(72) Inventor: Manmeet Singh Bhangu, Andaman and Nicobar Islands (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 350 days.

(21) Appl. No.: 18/280,562

(22) PCT Filed: Aug. 8, 2023

(86) PCT No.: PCT/US2023/029678
§ 371 (c)(1),
(2) Date: Sep. 6, 2023

(87) PCT Pub. No.: WO2024/248831
PCT Pub. Date: Dec. 5, 2024

(65) Prior Publication Data
US 2025/0097747 A1      Mar. 20, 2025

(30) Foreign Application Priority Data

May 31, 2023     (IN) .............................. 202341037445

(51) Int. Cl.
*H04W 4/38* (2018.01)
*H04W 24/08* (2009.01)
(Continued)

(52) U.S. Cl.
CPC ............. *H04W 4/38* (2018.02); *H04W 24/08* (2013.01); *H04W 24/10* (2013.01); *H04W 84/02* (2013.01); *H04W 88/18* (2013.01); *H04W 92/02* (2013.01)

(58) Field of Classification Search
CPC ....... G16Y 10/05–90; G16Y 20/10–40; G16Y 30/00–10; G16Y 40/10–60;
(Continued)

(56) References Cited

U.S. PATENT DOCUMENTS

2023/0370820 A1 *  11/2023  Cheng ..................... H04W 4/38
2024/0056783 A1 *  2/2024  Qiao ........................ H04W 4/38
2024/0205719 A1 *  6/2024  Chong ..................... H04W 4/38

FOREIGN PATENT DOCUMENTS

WO      2022/133867  A1     6/2022
WO      2022/133951  A1     6/2022

OTHER PUBLICATIONS

Deutsche Telekom, et al., "pCR on updating Sensor Groups use case and proposing new definitions," 3GPP TSG SA WG1 Meeting #101, Feb. 20-24, 2023, S1-230544 (7 pages total).
(Continued)

*Primary Examiner* — Timothy J Weidner
(74) *Attorney, Agent, or Firm* — Sughrue Mion, PLLC

(57) ABSTRACT

Provided are a system, a method, and a device for implementing sensing and communication functions in a telecommunication system. The system may include at least one sensor node and at least one server node configured to obtain and provide one or more sensing data to one or more network functions. The at least one sensor node may include at least one of a 3GPP node and a non-3GPP node. The at least one server node may include: a memory storage storing instructions for implementing a sensing function and a processor communicatively coupled to the memory storage. The processor may be configured to execute the instructions
(Continued)

800 to: receive, from the one or more network functions, the one or more sensing data; process the one or more sensing data to produce one or more sensing results; and output, to the one or more network functions, the one or more sensing results.

20 Claims, 8 Drawing Sheets

(51) Int. Cl.
| | | |
|---|---|---|
| *H04W 24/10* | (2009.01) | |
| *H04W 84/02* | (2009.01) | |
| *H04W 88/18* | (2009.01) | |
| *H04W 92/02* | (2009.01) | |

(58) Field of Classification Search
CPC .......... H04B 17/0082–409; H04L 41/14–149; H04L 43/02–55; H04L 67/12–125; H04W 4/30–80; H04W 8/18–245; H04W 24/02–10; H04W 80/02–12; H04W 84/005–22; H04W 88/005–188; H04W 92/02–24

See application file for complete search history.

(56) References Cited

OTHER PUBLICATIONS

Qualcomm et al., "Update to Use case on Seamless XR Streaming," 3GPP TSG SA WG1, Meeting #101, Feb. 20-24, 2023, S1-230113 (5 pages total).

Xiaomi, "Motivation for Integrated Sensing and Communication", 3GPP TSG SA WG2 Meeting #157, S2-2306535, May 22-26, 2023, 9 pages.

* cited by examiner

800

SYSTEM AND METHOD FOR IMPLEMENTING SENSING AND COMMUNICATION FUNCTION IN A TELECOMMUNICATION SYSTEM

CROSS REFERENCE TO RELATED APPLICATIONS

This application is a National Stage of International Application No. PCT/US2023/029678 filed Aug. 8, 2023, claiming priority from Indian Provisional Patent Application No. 202341037445, filed with the Indian Patent Office on May 31, 2023 and entitled "IMPLEMENTING SENSING AND COMMUNICATION FUNCTION IN 5G AND 6G SYSTEM", the disclosure of which is incorporated herein by reference in its entirety.

TECHNICAL FIELD

Systems, methods, devices, or the like, consistent with example embodiments of the present disclosure, relate to sensing technologies in telecommunication systems, and more specifically, relate to implementing sensing and communication functionalities in one or more telecommunication systems, such as 5G systems and 6G systems.

BACKGROUND

Telecommunication systems have been evolving continuously, in order to meet the changing demands of users, businesses, and societies. With the rapid world-wide commercialization of advanced telecommunication technologies (such as 5G systems, and the like), not only will the communication capability of the telecommunication systems be enhanced (such as provisioning of telecommunication systems with faster speed and lower latency), but also more devices (such as cars, buildings, appliances, and the like) may be utilized as network nodes in the telecommunication systems, wherein the devices may be connected to and be interoperated with each other.

With the increments in the variants and types of network nodes in the telecommunication systems, such as the involvement of nodes which can provide sensing functionalities (e.g., nodes which can sense their surroundings and exchange their observations through communication, etc.), it is possible to transform the telecommunication systems into intelligent systems, in which the network nodes are communicably connected to each other in a smart way.

The concept of integrating the sensing technologies into the telecommunication systems has been introduced in the related art, in order to enhance the telecommunication networks thereby. For instance, the concept of provisioning of Integrated Sensing and Communication (ISAC) in telecommunication systems, such as a 5G system, a 6G system, and the like, has been raised. In general, ISAC refers to the convergence and implementation of sensing and communication technologies into a unified telecommunication system. Ideally, by utilizing ISAC in telecommunication systems, the telecommunication infrastructure may be utilized to provide sensing related features or services addressing different target fields and applications, such as autonomous/assisted driving, Vehicle-to-Everything (V2X), Unmanned Aerial Vehicles (UAVs), 3D map reconstruction, smart city, smart home, factories, healthcare, maritime sector, and the like. Accordingly, the objectives of integrating the sensing technologies into the telecommunication systems are to reduce the resources required for provisioning of sensing-related services, to improve spectral and energy efficiencies, and to reduce the hardware and signaling costs.

Nevertheless, although the concept and objectives of utilizing sensing functionalities with communication technologies (e.g., ISAC, etc.) in telecommunication networks or systems have been introduced in the related art, the specific system architectures and approaches for integrating and implementing the sensing technologies into the telecommunication systems remain unclear and unspecified to date.

In view of the above, there is a need to define the system architectures and procedures associated with the implementation of sensing technologies in telecommunications systems. For instance, there is a need to define the system architectures and procedures for hosting or deploying the sensing functionalities, for obtaining sensing data, for communicating sensing data between nodes in the network, for processing and analyzing the sensing data, and the like.

It can be understood that the information described hereinabove is only for enhancement of understanding of the general background of the present disclosure and should not be taken as an acknowledgement or any form of suggestion that this information forms the prior art already known to a person skilled in the art.

SUMMARY

Example embodiments of the present disclosure provide system architectures, system configurations, and procedures for efficiently and effectively implementing sensing functionalities in one or more telecommunication systems.

According to embodiments, a system may be provided. The system may include at least one sensor node and at least one server node. The at least one sensor node may be configured to obtain one or more sensing data and to provide the one or more sensing data to one or more network functions. Further, the at least one sensor node may include at least one 3GPP node, at least one non-3GPP node, or a combination thereof. The at least one server node may include: a memory storage storing instructions for implementing a sensing function and at least one processor communicatively coupled to the memory storage. The at least one processor may be configured to execute the instructions to: receive, from the one or more network functions, the one or more sensing data; process the one or more sensing data to produce one or more sensing results; and output, to the one or more network functions, the one or more sensing results.

According to embodiments, a method may be provided. The method may be performed by at least one processor of at least one server node of a system upon executing instructions for implementing a sensing function. The method may include: receiving, from one or more network functions, one or more sensing data; processing the one or more sensing data to produce one or more sensing results; and outputting, to the one or more network functions, the one or more sensing results. The one or more sensing data may be provided to the one or more network functions by at least one sensor node, and the at least one sensor node may include at least one 3GPP node, at least one non-3GPP node, or a combination thereof.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
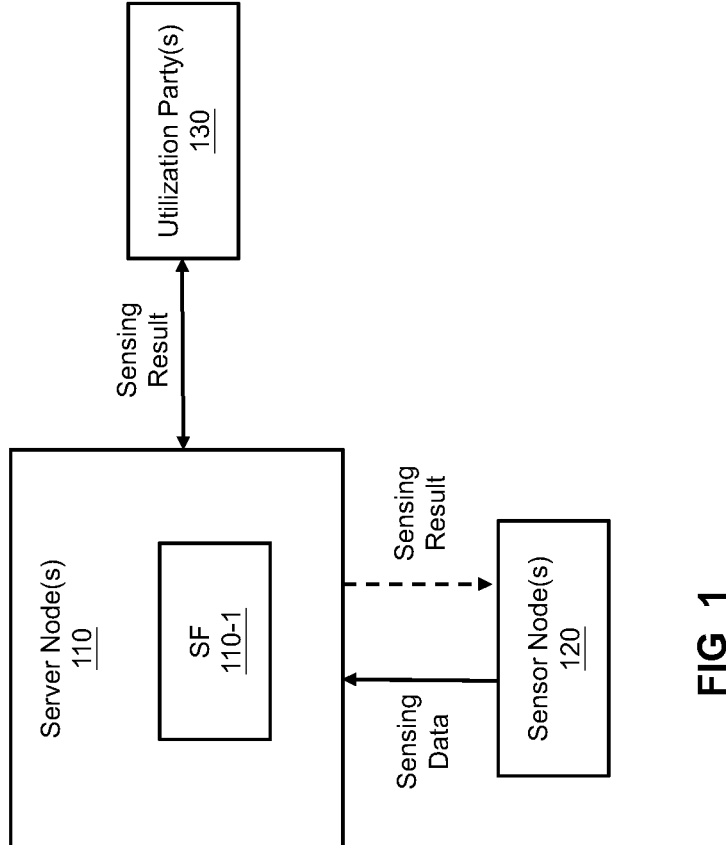
FIG. 1 illustrates a block diagram of a generic system architecture for implementing sensing function in a telecommunication system, according to one or more embodiments.
Figure 1:

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise forms disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limited to the described implementations. Thus, the operation and behavior of the systems and/or methods are described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Further, it can be understood that the terms "sensing function", "sensing functionalities" and "sensing and communication functionalities" described herein may refer to the same concept and may be used interchangeably herein.

Example embodiments of the present disclosure provide system architectures, system configurations, and procedures for efficiently and effectively implementing sensing functionalities in one or more telecommunication systems.

According to embodiments, a system architecture for implementing the sensing functionalities is provided. Specifically, example embodiments of the present disclosure provide a system including at least one server node to store or host a dedicated sensing function (SF) (which may also be referred to as "sensing and communication function", "SACF" or collectively as "SF/SACF" herein) and at least one sensor node to sense and obtain sensing data.

The server node may execute the SF to obtain the sensing data from the sensor node via the infrastructure of the telecommunication system, and may manage the sensing data independently from the operations of the sensor node. Further, the server node may process the sensing data to produce or generate one or more sensing results, and may output the one or more sensing results to at least one target node or target location, via the infrastructure of the telecommunication system. Descriptions of an example system architecture for implementing the sensing functionalities are provided below with reference to FIG. 1.

Since the implementation of SF in example embodiments of the present disclosure utilizes the infrastructure of the telecommunication system, the existing network infrastructure may be utilized and the cost of implementing the SF may be minimized. Further, the time for development and roll-out of new sensing services may be reduced.

Further, the implementation of SF in example embodiments of the present disclosure segregates the sensing data measurement operations and the sensing data management operations. Namely, the sensor node is only required to measure and obtain the sensing data, without requiring managing the sensing data, while the server node is only required to manage (e.g., store, process, etc.) the sensing data. Accordingly, the power consumption in each of the sensor node and the server node may be optimized. For instance, since the sensing data processing is performed at the server node, the power consumption at the sensor node can be significantly reduced. The sensor node only need to regularly obtain the sensing data (e.g., signal information, etc.) and provide the same to the server node, without requiring knowing how the data will be processed, the target location to which the sensing results should be sent, and the like. Furthermore, the management scheme of the sensing data may be adjusted or tuned, without requiring the users to physically visit the site at which the sensor node is located.

According to embodiments, the SF may interoperate with one or more network functions of the core network of the telecommunication system in communicating the sensing information, such as the sensing data and the sensing results. The SF may be hosted or deployed in a server node nearby the component(s) at which the one or more network functions are deployed, which is typically a server in a regional data center or a server in a central data center. Alternatively, the SF may be hosted or deployed in a server nearby the sensor node and/or nearby the node which may utilize the sensing result. Such server may be located in an edge data center, and thus said server may be referred to as "edge server" herein. Descriptions of examples of system configuration, in which the SF interoperates with one or more network functions, are provided below with reference to FIG. 2 and FIG. 3.

The implementation of SF in example embodiments of the present disclosure enables interaction and interoperation among the SF and the core network function(s), which allows efficient communication of the sensing information (e.g., sensing data, sensing result, etc.), and may allow the core network function(s) to utilize the sensing information to enhance the network performances.

According to embodiments, the SF may be hosted or deployed in a cloud server or cloud computing environment. Descriptions of an example environment, in which the SF may be implemented, are provided below with reference to FIG. 4. Further, the SF may be containerized and be deployed in a container-based server. Accordingly, the implementation of SF in example embodiments of the present disclosure may leverage the advantages of containerization, such as high scalability, reliability, portability, and resource efficiency. Descriptions of examples of server nodes in which the SF may be implemented, are provided below with reference to FIG. 5 to FIG. 7, and descriptions of example operations which may be performed by the server node(s) are provided below with reference to FIG. 8.

Ultimately, the example embodiments of the present disclosure provide system architectures, system configurations, and operations for implementing and utilizing SF in a telecommunication system, which enable the telecommunication system to effectively, efficiently, and seamlessly integrate sensing operations and providing sensing services.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations, as well as the technical advantages associated therewith, of example embodiments of the present disclosure are provided below.

General System Architecture

FIG. 1 illustrates a block diagram of a generic system architecture 100 for implementing a sensing function in a telecommunication system, according to one or more embodiments.

As illustrated in FIG. 1, the system architecture 100 may include one or more server nodes 110, one or more sensor nodes 120, and one or more utilization parties 130. The server node(s) 110, the sensor node(s) 120, and the utilization party(s) 130 may be communicatively coupled to each other via wireless and/or wired connection, and may be configured to interoperate with each other.

In general, the sensor node(s) 120 may be configured to perform one or more sensing operations to measure or obtain one or more sensing data, and to provide the one or more sensing data to the server node(s) 110 for management (e.g., storing/backup, further processing, etc.). The server node(s) 110 may be configured to receive one or more sensing data from the sensor node(s) 120, to process the sensing data to produce one or more sensing results, and to provide the one or more sensing results to the utilization party(s) 130 and/or to the sensor node(s) 120 for utilization.

The at least one server node 110 may include one or more servers which may include one or more components (e.g., storage, etc.) configured to store or host at least one sensing function (SF) 110-1, and may have one or more components (e.g., processor, etc.) configured to execute or utilize the at least one SF 110-1 to manage (e.g., receive, store, process, etc.) one or more sensing data. Descriptions of example components which may be included in the server node 110 are provided below with reference to FIG. 6 and FIG. 7, and descriptions of example operations which may be performed by the server node are provided below with reference to FIG. 8.

According to embodiments, the server node(s) 110 may include one or more edge servers (may also be referred to as "edge node" herein), which is a server(s) deployed or implemented in one or more edge data center(s) located nearby a target device(s) rather than in a central data center. For instance, the server node(s) 110 may be located or deployed in one or more edge data centers nearby the sensor node(s) 120 and/or nearby the utilization party(s) 130. By implementing the server node(s) 110 (and the SF 110-1 included therein) on the edge side, the sensing related data may be obtained, be processed, and/or be delivered with reduced latency, which in turn improves the performance and reliability of applications or services that require real-time or near-real-time sensing data processing and low-latency, such as autonomous vehicles navigation, disaster management, and the like.

Additionally or alternatively, the server node(s) 110 may include one or more centralized servers (may also be referred to as "central node") which is a server(s) deployed or implemented in one or more central data center(s). The centralized server(s) may be communicatively coupled to a plurality of servers configured to store, host, or deploy a plurality of network functions or network services of the telecommunication system.

The sensing function (SF) 110-1 described herein (which may also be described as sensing and communication function (SACF), or any other suitable terms) may refer to a dedicated network function that obtains, stores, processes, manages, and outputs sensing-related information. The SF 110-1 may be defined in software-based forms, such as computer-executable instructions, algorithms, or software application programs. Additionally or alternatively, the SF 110-1 may be defined in the form of a virtualized network function (vNF), an element of software-defined networking (SDN), or the like.

By introducing and implementing SF 110-1 in the server node(s) 110, the sensing functionalities that traditionally ran on dedicated hardware sensors may be virtualized or defined in software-form, and the sensing processes that were traditionally restricted on one or more dedicated hardware sensors may be segregated and be implemented in different nodes that may be located at different locations (e.g., obtaining of sensing data being implemented in the sensor node(s) 120 and processing of the sensing data being implemented in the server node(s) 110, etc.). Accordingly, sensing data may be obtained from a larger amount of sensor nodes scattered around a wider area, increasing the size of the sensing area and providing opportunities for new sensing services.

According to embodiments, the SF 110-1 may be hosted, deployed, or implemented in a cloud server or a cloud server cluster, such as a hybrid could server/hybrid cloud cluster, and the like. Descriptions of an example cloud environment for implementing the SF 110-1 are provided below with reference to FIG. 4.

Alternatively or additionally, the SF 110-1 may be containerized and be hosted, deployed, or implemented in one or more container-based servers or platforms in the form of containers, pods, and/or microservices. For instance, the server node(s) 110 may include one or more container-based nodes (e.g., Kubernetes (K8s) node, etc.), and the SF 110-1 may be segregated and be distributed across multiple containers according to, for example, operations and functionalities of the SF 110-1. By deploying the SF 110-1 as containerized applications, the benefits of containerization, such as high portability, scalability, and resource efficiency, can be leveraged in the implementation of the SF 110-1. Descriptions of an example container-based server node for implementing the SF 110-1 are provided below with reference to FIG. 5.

According to embodiments, the server node(s) 110 may be configured to utilize the SF 110-1 together with one or more additional network functions. For instance, the server node(s) 110 may be configured to store/host said one or more additional network functions, and/or may interoperate with one or more equipment/nodes hosting said one or more additional network functions when required. Said one or more additional network functions may include network function(s) of a core network of a telecommunication system, such as LTE evolved packet core (EPC) network, 5G core network, 6G core network, and the like.

In a non-limiting example, the one or more additional network functions with which the SF 110-1 may interoperate may include one or more of: Access and Mobility Management Function (AMF), Session Management Function (SMF), Network Exposure Function (NEF), User Plane Function (UPF), Network Slice Selection Function (NSSF), Network Slice Specific Authentication and Authorization Function (NSSAAF), Authentication Server Function (AUSF), Network Repository Function (NRF), Policy Control Function (PCF), Unified Data Management (UDM), Service Communication Proxy (SCP), Application Function (AF), Network Slice Admission Control Function (NSACF), Edge Application Server Discovery Function (EASDF), Non-3GPP InterWorking Function (N3IWF), Trusted Non-3GPP Gateway Function (TNGF), Unified Data Repository (UDR), Unstructured Data Storage Function (UDSF), Short Message Service Function (SMSF), 5G Equipment Identity Register (5G-EIR), Location Management Function (LMF), Gateway Mobile Location Centre (GMLC), Security Edge Protection Proxy (SEPP), Network Data Analytics Function (NWDAF), Wireline Access Gateway Function (W-AGF), UE Radio Capability Management Function (UCMF), Trusted WLAN Interworking Function (TWIF), Data Collection Coordination Function (DCCF), Messaging Framework Adapter Function (MFAF), Analytics Data Repository Function (ADRF), Multicast Broadcast Session Management Function (MB-SMF), Multicast Broadcast User Plane Function (MB-UPF), Multicast/Broadcast Service Function (MBSF), Multicast/Broadcast Service Transport Function (MBSTF), Time Sensitive Communication Time Synchronization Function (TSCTSF), 5G Direct Discovery Name Management Function (5G DDNMF), Time-Sensitive Networking Application Function (TSN AF), and Non-Seamless WLAN Offload Function (NSWOF). It can be understood that the one or more additional network functions may include any other suitable network functions defined in or specified in one or more specifications provided by 3rd Generation Partnership Project (3GPP) standard organization, without departing from the scope of the present disclosure.

The SF 110-1 may be configured to communicate with each of the aforesaid one or more additional network functions via a respective, dedicated interface. As further described below, example embodiments of the present disclosure provide a dedicated service-based interface (SBI) "Nsf" for exposing the functionalities of the sensing function (e.g., SF 110-1) to one or more of the aforesaid one or more additional network functions. Via the Nsf interface, the SF 110-1 may communicate with other network functions and may interoperate therewith.

Similarly, each of the aforesaid one or more additional network functions may communicatively couple to the SF 110-1 via a respective, dedicated interface. For instance, in service-based architecture (SBA), each of said network functions may expose its respective functionalities (e.g., network capabilities, resources, information, etc.) through a dedicated SBI (e.g., the NEF may expose functionalities via Nnef interface, the AMF may expose functionalities via Namf interface, the SMF may expose functionalities via Nsmf interface, etc.). In addition to SBI, a portion of the aforesaid one or more additional network functions may also expose functionalities through interfaces defined by reference point representations. For instance, the AMF may communicate with a user equipment (UE) via N1 interface, the AMF may communicate with an access network (or a component associated therewith, such as gNodeB and the like) via N2 interface, the access network (or the component associated therewith) may communicate with the UPF via N3 interface, the SMF may communicate with the UPF via N4 interface, the UPF may communicate with a data network (DN) via N6 interface, multiple UPFs (e.g., the Intermediate I-UPF and the UPF Session Anchor, etc.) may communicate with each other via N9 interface, and the like.

Descriptions of an example use case in which the SF 110-1 is being utilized together with NEF are provided below with reference to FIG. 2, and descriptions of an example use case in which the SF 110-1 is being utilized together with AMF, SMF, and UPF are provided below with reference to FIG. 3.

According to embodiments, the functionalities of the SF 110-1 may be segregated into a plurality of categories according to the respective functionality(s). For instance, the functionalities of the SF 110-1 may be segregated into a first category which is associated with Control Plane related functionality(s), and into a second category which is associated with User Plane related functionality(s). The Control Plane related functionality(s) may include sensing functionality(s) which controls the operations of one or more sensing services and manages the initiation, termination, and synchronization of one or more sensing tasks (e.g., authorization of sensing entity(s), network traffic allocated for the sensing service(s), etc.). On the other hand, the User Plane related functionality(s) may include sensing functionality(s) for managing the transmission and communication of sensing data and sensing result(s), ensuring efficient and reliable transport of information from one node to another, and the like.

According to embodiments, the SF 110-1 may be hosted or deployed in a plurality of server nodes 110. In this regard, the SF 110-1 may be hosted or deployed in the plurality of server nodes 110 according to, for example, the functionality category. For instance, a first portion of the SF 110-1 which is associated with the Control Plane related functionality(s) may be hosted or deployed in a first server node 110, and a second portion of the SF 110-1 which is associated with the User Plane related functionality(s) may be hosted or deployed in a second server node 110. In some implementations, the first portion of the SF 110-1 may be hosted or deployed in an edge server, and the second portion of the SF 110-1 may be hosted or deployed in a central server. Further, the SF 110-1 may be hosted or deployed in the plurality of server nodes 110 according to the network operation(s) with which the respective functionality interoperates. For instance, the second portion of the SF 110-1 (which is associated with the User Plane related functionality(s)) may be hosted at a server which stores or hosts the UPF (or a server nearby the server that stores or hosts the UPF). In this way, the SF 110-1 may be implemented with high reliability and resiliency.

In view of the above, the virtualization of the sensing functionalities into the SF 110-1 and the segregation of the functionalities of the SF 110-1 allow the virtualized sensing functionalities to be implemented dynamically and flexibly according to different network configurations and/or network requirements, and at the same time allow centralized management of sensing tasks and sensing information. As a result, the sensing functionalities can be implemented easily, flexibly and optimally.

Referring still to FIG. 1, the one or more sensor nodes 120 may include one or more equipment, devices, and the like, which may be configured to measure, monitor, capture, obtain, store (temporarily or for a period of time), and/or transmit one or more sensing data.

According to embodiments, the one or more sensor nodes 120 may include at least one sensing transceiver which may be configured to transmit and receive the one or more sensing data. According to other embodiments, the one or more sensor nodes 120 may include at least one sensing transmitter which may be configured to send out the one or more sensing data (e.g., in the form of signal, etc.) and at least one sensing receiver which may be configured to receive the one or more sensing data.

According to embodiments, the one or more sensor nodes 120 may include one or more equipment, apparatuses, devices, or the like, which may be configured to obtain the one or more sensing data by: emitting one or more signals (in the form of radio wave, etc.) and capturing information of one or more responded or returned signals. The one or more responded signals may be the reflected, refracted, and/or diffracted version of the one or more emitted signals (may be referred to as "reflected signal", "refracted signal", and "diffracted signal", respectively, herein).

The one or more sensor nodes may be compatible with or comply with one or more features and/or requirements specified in one or more specifications provided by the 3GPP standard organization. For example, the one or more sensor nodes 120 may include one or more 3GPP-based user equipment (UE), such as a computing device (e.g., a desktop computer, a laptop computer, a tablet computer, a handheld computer, a smart device, a server, etc.), a mobile phone (e.g., a smartphone, a radiotelephone, etc.), a wearable device (e.g., a pair of smart glasses or a smart watch), a SIM-based device (e.g., a vehicle capable of utilizing V2X technology, etc.), and/or any other suitable device or equipment which may be configured to emit and transmit one or more signals in the form of 3GPP radio signal(s) and/or via one or more 3GPP interfaces. Additionally or alternatively, the one or more sensor nodes 120 may include one or more 3GPP-based network nodes, such as one or more 3GPP-based access networks (e.g., 5G New Radio (NR) Radio Access Network (RAN), 6G RAN, etc.), one or more 3GPP-based base stations (e.g., LTE eNodeB, 5G gNodeB, etc.) associated with the access network(s), and/or any other type of network device or equipment. The term "3GPP sensor node" described hereinbelow may refer to one or more of the 3GPP-based sensor nodes provided hereinabove.

According to embodiments, the one or more sensor nodes 120 may also include one or more equipment, apparatuses, devices, or the like, which may have one or more hardware sensors associated therewith. The one or more hardware sensors may include: an accelerometer which measures and captures data associated with the acceleration/deceleration of an object; an image sensor (e.g., camera, etc.) which detects and captures image data surrounding or nearby the object; a light detection and ranging (LiDAR) sensor which detects and captures data associated with light in one or more light spectrums, such as the visible spectrum, the infrared spectrum, the ultraviolet spectrum, and/or any other light spectrums; an audio sensor (e.g., microphone, etc.) which detects and captures audio data surrounding or nearby the object; a temperature sensor which measures and captures data associated with temperature surrounding or nearby the object; a location sensor (e.g., global positioning system (GPS), inertial measurement unit (IMU), etc.) which measures and captures data associated with the location, position, and/or orientation of the object; a contact sensor (e.g., pressure detector, impact detector, etc.) which detects and captures data between a portion of the object and another object; an air sensor which measures and captures data associated with the air (e.g., oxygen level, pollution level, humidity level, etc.) surrounding or nearby the object; and any other suitable type of sensor. Accordingly, said sensor nodes may be configured to obtain the one or more sensing data without requiring the utilization of 3GPP-radio signals, and may be referred to as "non-3GPP sensor node" herein.

According to embodiments, the one or more sensor nodes 120 may include a plurality of sensor nodes, such as a plurality of 3GPP sensor nodes, a plurality of non-3GPP sensor nodes, or a mixture of 3GPP sensor node(s) and non-3GPP sensor node(s). In some implementations, at least a portion of the plurality of sensor nodes 120 may be located at a geographical location(s) different from another portion of the plurality of sensor nodes 120, the server node(s) 110 and/or the utilization party(s) 130.

Further, said plurality of sensor nodes may interoperate with one another. For instance, a UE may transmit one or more obtained sensing data to a gNodeB, and the gNodeB may transmit the one or more sensing data provided by the UE, along with one or more sensing data obtained by the gNodeB, to the server node(s) 110. As another example, an image sensor may interoperate with an audio sensor to present the one or more sensing data in the form of a video file, before transmitting the one or more sensing data to the server node(s) 110.

Alternatively, the plurality of sensor nodes may simply provide the obtained sensing data to the server node(s) 110, and the server node(s) 110 may be configured to utilize the SF 110-1 to process the sensing data obtained from the plurality of sensor nodes. For instance, the server node(s) 110 may utilize the SF 110-1 to receive one or more sensing data from one or more 3GPP sensor nodes (may be referred to as "3GPP sensing data" herein) and to analyze the 3GPP sensing data to produce one or more sensing results. Similarly, the server node(s) 110 may be configured to utilize the SF 110-1 to receive one or more sensing data from one or more non-3GPP sensor nodes (may be referred to as "non-3GPP sensing data" herein) and to analyze the non-3GPP sensing data to produce one or more sensing results. According to embodiments, the server node(s) 110 may be configured to utilize the SF 110-1 to receive both 3GPP sensing data and non-3GPP sensing data, and to produce the one or more sensing results based on the 3GPP sensing data and the non-3GPP sensing data. For instance, the server node(s) 110 may combine the 3GPP sensing data and the non-3GPP sensing thereto to produce a combined sensing dataset, and may then analyze the combined sensing dataset to produce one or more combined sensing results. Additionally or alternatively, the sever node(s) 110 may utilize the SF 110-1 to produce one or more sensing results based on one of the 3GPP sensing data and the non-3GPP sensing data, and may utilize another one of the 3GPP sensing data and the non-3GPP sensing data to verify and/or to enhance the produced one or more sensing results.

In some implementations, the server node(s) 110 may be configured to include sensing contextual information into the one or more sensing results when providing or exposing the one or more sensing results (e.g., to the utilization party(s) 130, etc.). The sensing contextual information may include information of the context or the conditions under which the sensing results were derived, such as location of capture of the associated sensing data, time of capture of the associated sensing data, information of the sensor node(s) 120 (e.g., ID, location, type, etc.) which obtains the associated sensing data, and the like.

According to embodiments, the one or more sensing data provided by the one or more sensor nodes 120 may include sensing assistance information, which may be utilized by the server node(s) 110 to derive the one or more sensing results. For instance, the sensing assistance information may include map information, area information, a UE ID attached to or in the proximity of the sensing target, UE position information, UE velocity information, and the like.

Referring still to FIG. 1, the utilization party(s) 130 may include one or more systems, one or more equipment, one or more devices, one or more machines, and/or any other suitable system or node which may be configured to receive one or more sensing results from the server node(s) 110 and to utilize the one or more sensing results thereafter.

According to embodiments, the utilization party(s) 130 may include a system, an equipment, a node, or the like, associated with one or more trusted or authorized third parties. The trusted third party(s) may refer to a service provider (e.g., security service provider, weather forecasting service provider, healthcare service provider, etc.) which may utilize the one or more sensing results to provide one or more associated services to one or more users or subscribers.

Additionally or alternatively, the utilization party(s) 130 may include a device, a system, an equipment, or the like, associated with one or more authorities (e.g., fire departments, police departments, road conditions management units, natural disasters responding units, hospital/health emergency departments, etc.) which may utilize the one or more sensing results to provide a response or take an action to one or more incidents or events.

Further, the utilization party(s) 130 may include one or more network functions (or one or more components deploying the one or more network functions) which may utilize the one or more sensing results to enhance the network performances. Furthermore, the utilization party(s) 130 may include one or more storage mediums (e.g., cloud server/server cluster, data repository, etc.) which may be configured to store, host, publish, etc., the one or more sensing results. Accordingly, one or more sensing results may be accessed and retrieved for utilization when required.

In view of the above, the sensing functionalities may be efficiently and effectively implemented in one or more telecommunication systems. The nodes in the network systems may interoperate intelligently to obtain one or more sensing data, to process the one or more sensing data to thereby produce one or more sensing results, and to communicate the one or more sensing data and the one or more sensing results. In this way, example embodiments of the present disclosure may effectively and efficiently implement, leverage, and be compatible with the integrated sensing and communication concept (e.g., ISAC), and may thereby provide network performance optimization and enhancement and offer useful sensing services.

It can be understood that, the configuration illustrated in FIG. 1 is merely one of the possible embodiments, and the scope of the present disclosure should not be limited thereto. Specifically, the system architecture may include one or more additional component(s), may include fewer component(s) than as illustrated, and may be configured in a manner different from as illustrated. For instance, although FIG. 1 illustrates that the sensor node(s) 110 may provide the sensing result to the sensor node(s) 120, it is contemplated that in some embodiments the sensing result is not necessarily always provided to the sensor node(s) 120.

Examples Configurations for Implementing SF

As described above with reference to FIG. 1, according to embodiments, the sensing function (SF/SACF) may be implemented and be utilized together with one or more network functions of one or more core networks of one or more telecommunication systems (e.g., network function(s) of 5G core network, etc.). Below, descriptions of example use cases associated therewith are provided with reference to FIG. 2 and FIG. 3.

Figure 2:
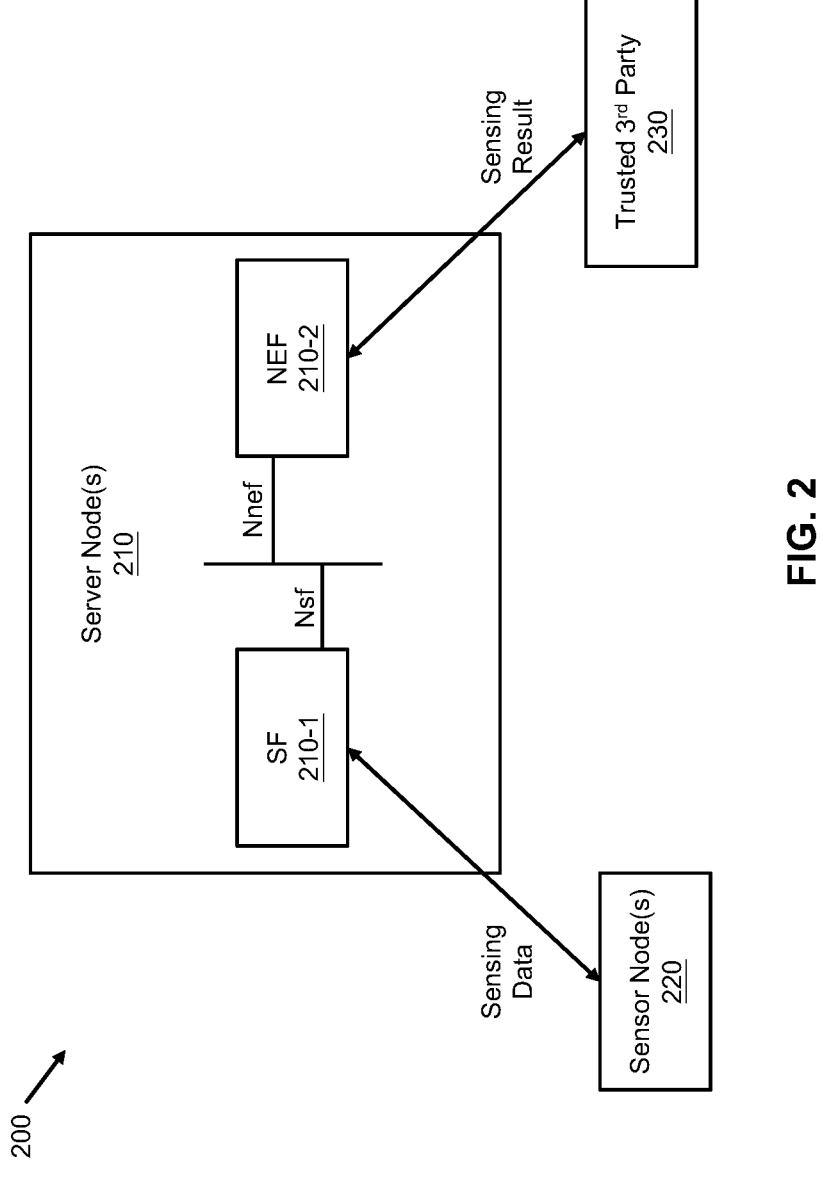
FIG. 2 illustrates a block diagram of an example system configuration for implementing the sensing function, according to one or more embodiments.

FIG. 2 illustrates an example system configuration 200 for implementing the sensing function, according to one or more embodiments. One or more components in system configuration 200 may be similar to one or more components described above with reference to FIG. 1. For instance, the server node(s) 210 (and the SF 210-1 associated therewith), the sensor node(s) 220, and/or the trusted third party 230 in FIG. 2 may be similar to the server node(s) 110 (and the SF 110-1 associated therewith), the sensor node(s) 120, and the utilization party(s) 130 in FIG. 1, respectively. Thus, it can be understood that the features described in relation to said components may be applicable to each other, unless being described otherwise.

Further, although it is illustrated in FIG. 2 that the server node(s) 210 includes both the SF 210-1 and a Network Exposure Function (NEF) 210-2, it can be understood that the SF 210-1 and the NEF 210-2 may be hosted or stored in different server nodes, without departing from the scope of the present disclosure. For instance, the SF 210-1 may be deployed or hosted in a first server node (e.g., one or more edge server nodes), while the NEF 210-2 may be deployed or hosted in a second server node (e.g., one or more central server nodes).

In the example use case of FIG. 2, a system/device associated with a trusted third party 230 (descriptions of examples of a trusted third party have been provided above with reference to FIG. 1) is used as an example of the utilization party(s). It can be understood that, in practice, the trusted third party 230 may be replaced by any other suitable system/device which may be communicatively coupled to the SF 210-1 via the NEF 210-2.

In general, the server node(s) 210 may be configured to communicatively couple to the sensor node(s) 220 and to receive one or more sensing data therefrom. Descriptions of example configurations and operations for communicatively coupling the server node(s) to several example sensor nodes are provided below with reference to FIG. 3. Accordingly, the server node(s) 210 may be configured to utilize the SF 210-1 to process the received one or more sensing data to produce or generate one or more sensing results. Subsequently, the server node(s) 210 may be configured to utilize or to interoperate with the NEF 210-2 to thereby communicatively couple to the trusted third party(s) 230 and to provide the one or more sensing results to the trusted third party(s) 230 thereafter.

Specifically, upon producing the one or more sensing results, the server node(s) 210 may be configured to utilize or to interoperate with the NEF 210-2 to determine a target location or a target node to which the one or more sensing results are required or are requested, and to transmit the one or more sensing results thereto. In this regard, the NEF 210-2 may refer to a network function which may utilize the network architecture (e.g., 3GPP network architecture such as 5G network architecture, 6G network architecture, etc.) to enable network exposure or service exposure within the network. Namely, the utilization of the NEF 210-1 may make network capabilities, such as data and network services, easily available for the associated users (e.g., network operator, service providers and trusted third parties, etc.), and thereby enable network data and resources to be accessible for different ecosystems to enrich and enhance different sensing services and applications.

In the example of FIG. 2, it is assumed that the server node(s) 210 has utilized the NEF 210-2 to determine that the sensing result(s) (produced based on the sensing data provided by the sensor node(s) 220) is required or is requested by the trusted third party(s) 230. The information (e.g., sensing result(s), etc.) may be exchanged and communicated among the SF 210-1 and the NEF 210-2 via a SBI associated with the NEF 210-2, such as the Nnef interface. The NEF 210-2 may be part of network functions of one or more 3GPP defined networks (e.g., 5G core network, 6G core network, etc.). Alternatively or additionally, said information may be exchanged and communicated among the SF 210-1 and the NEF 210-2 via a SBI associated with the SF 210-1. In this regard, the SBI associated with the SF of example embodiments is described herein as "Nsf", although it can be understood that said SBI may have any other suitable labelling, without departing from the scope of the present disclosure. For instance, in the case of the SF of the present disclosure being adopted as a part of ISAC, said SBI may have a labelling of "Nisac", or the like. As another example, in the case of the virtualized sensing function being described as "SACF", said SBI may have a labelling of "Nsacf", or the like.

To this end, the sensing function SF 210-1 may be implemented and be utilized so as to interoperate with the NEF 210-2 and one or more trusted third parties 230 in the network. For instance, the SF 210-1 may process the sensing data to determine available spectrum bands, and may include such information in the sensing result(s). Accordingly, the NEF 210-2 may expose or provide the spectrum availability information to one or more trusted third parties 230 via, for example, at least one application programming interface (API). Subsequently, the one or more trusted third parties 230 may leverage said information to manage the associated spectrum (e.g., select optimal frequency bands for operation, etc.) to thereby optimize the wireless communication with the network.

As another example, the SF 210-1 may process the sensing data to determine location information of nodes associated with one or more end-users, and may include such information in the sensing result(s). Accordingly, the NEF 210-2 may expose or provide the location information to the one or more trusted third parties 230 via, for example, the at least one API. Subsequently, the one or more trusted third parties 230 may utilize the location information to deliver personalized and/or context-based services to the one or more end-users based on the associated location.

In view of the above, example embodiments of the present disclosure may implement and utilize the sensing functionality (SF/SACF) such that said sensing functionality may interoperate with the network exposure function (NEF) of the telecommunication network system, so as to efficiently and effectively provide or expose sensing information to a trusted third party(s).

Figure 3:
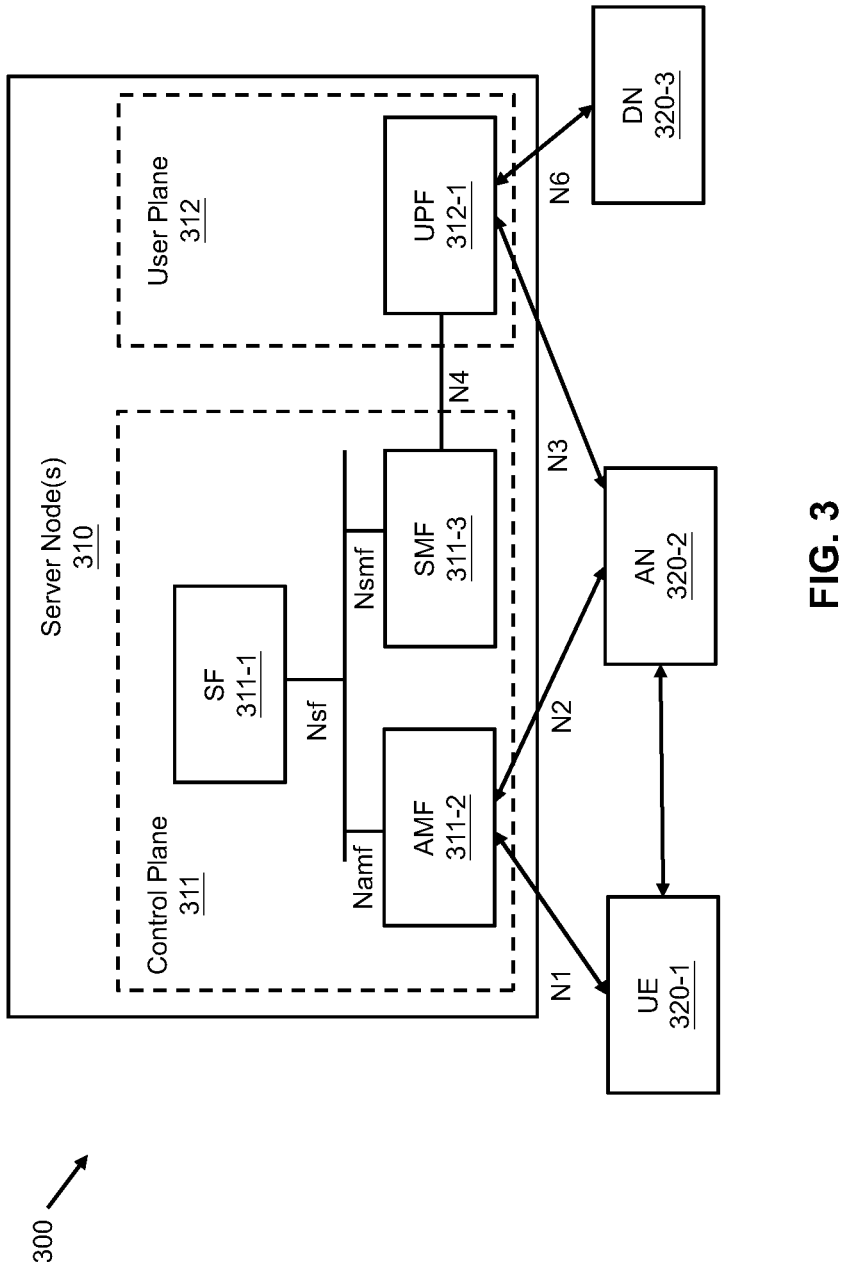
FIG. 3 illustrates a block diagram of another example system configuration for implementing the sensing function, according to one or more embodiments.

FIG. 3 illustrates a block diagram of another example system configuration 300, according to one or more embodiments. One or more components in system configuration 300 may be similar to one or more components described above with reference to FIG. 1 and/or FIG. 2. For instance, the server node(s) 310 (and the SF 310-1 associated therewith) in FIG. 3 may be similar to the server node(s) 110 (and the SF 110-1 associated therewith) in FIG. 1 and/or may be similar to the server node(s) 210 (and the SF 210-1 associated therewith) in FIG. 2. Further, the user equipment (UE) 320-1 and the access network (AN) 320-2 in FIG. 3 are examples of the sensor node(s) 120 in FIG. 1 and/or the sensor node(s) 220 in FIG. 2. Furthermore, the data network (DN) 320-3 in FIG. 3 may have the role of sensor node(s) 120 in FIG. 1, the role of sensor node(s) 220 in FIG. 2, the role of the utilization party(s) 130 in FIG. 1 and/or the role of the trusted third party(s) 230 in FIG. 2. Thus, it can be understood that the features described in relation to said components may be applicable to one other, unless being described otherwise.

In general, the server node(s) 310 may be configured to utilize the SF 311-1 together with a plurality of network functions so as to communicatively couple to the UE 320-1, the AN 320-2, and the DN 320-3. The plurality of network functions may include an Access and Mobility Management Function (AMF) 311-2, a Session Management Function (SMF) 311-3, and a User Plane Function (UPF) 312-1. One or more of said network functions may be part of network functions of one or more core networks (e.g., 5G core network, 6G core network, etc.).

According to embodiments, the SF 311-1, the AMF 311-2, and the SMF 311-3 may form a portion of a Control Plane 311, and the UPF 312-1 may form a portion of a User Plane 312. Alternatively or additionally, a portion of the SF 311-1 may be associated with the User Plane 312.

Further, although it is illustrated in FIG. 3 that the server node(s) 310 includes the SF 311-1, the AMF 311-2, the SMF 311-3, and the UPF 312-1, it can be understood that the SF 311-1 and the AMF 311-2, the SMF 311-3, and/or the UPF 312-1, may be hosted or stored in different server nodes, without departing from the scope of the present disclosure. For instance, the SF 311-1 may be deployed or hosted in a first server node (e.g., one or more edge server nodes), while the AMF 311-2, the SMF 311-3, and the UPF 312-1 may be deployed or hosted in a second server node (e.g., one or more central server nodes), and the like.

According to embodiments, the server node(s) 310 may be configured to utilize the SF 311-1 to communicate with the UE 320-1 and the AN 320-2 via the AMF 311-2. In this regard, the AMF 311-2 may act as an entity responsible for access, mobility, and session management functions for the UE 320-1, ensuring efficient and secure connectivity between the UE 320-1, the server node(s) 310, and the AN 320-2.

The AN 320-2 may include a radio access network (RAN), which may include at least one base station (e.g., eNodeB, gNodeB, etc.), at least one radio unit (e.g., remote radio unit (RRU), etc.), at least one antenna system (e.g., distributed antenna system (DAS), etc.), at least one radio network controller, and any other suitable components which may be configured to obtain and/or transmit one or more sensing data.

In operation, the server node(s) 310 may be configured to utilize the SF 311-1 to receive one or more sensing data from the UE 320-1 and/or the AN 320-2. For instance, upon obtaining the sensing data, the UE 320-1 may access the server node(s) 310 and transmit the obtained sensing data to the server node(s) 310. In this regard, the AMF 311-2 may be utilized to manage the access of the UE 320-1, before the UE 320-1 may provide the sensing data to the server node(s) 310. By way of example, upon authenticating and authorizing the access of the UE 320-1 via utilizing the AMF 311-2, the server node(s) 310 may receive the sensing data from the UE 320-1 and may further utilize the SF 311-1 to manage the sensing data thereafter. The communications among the UE 320-1 and the AMF 311-2 may be performed via N1 interface, and the communications among the SF 311-1 and the AMF 311-2 may be performed via a SBI associated with the AMF 311-2 (may be referred to as "AMF interface" or "Namf") and/or via a SBI associated with the SF 311-1 (e.g., Nsf).

It is contemplated that the AN 320-2 (or one or more components associated therewith) may access the server node(s) 310 via the utilization of AMF 311-2, in a similar manner. In this regard, the communication among the AN 320-2 (or one or more components associated therewith) and the AMF 311-2 may be performed via N2 interface. Further, the UE 320-1 and the AN 320-2 may be communicatively coupled to each other via any suitable means or channels.

In view of the above, the AMF 311-2 may act as an entity responsible for access, mobility, and session management functions for the UE 320-1, ensuring efficient and secure connectivity between the UE 320-1, the server node(s) 310, and the AN 320-2. Further, via the AMF 311-2, the server node(s) 310 may receive sensing data and provide one or more sensing results (or information associated therewith) to the UE 320-1 and the AN 320-2, to thereby enhance the cooperation between the UE 320-1 and the AN 320-2.

For instance, the server node(s) 310 may determine information of available spectrum band in real-time or near real-time based on the obtained sensing data and may provide said information to the UE 320-1 or the AN 320-2 via the AMF 311-2. Accordingly, the UE 320-1 may utilize the spectrum information to select the most optimal frequency band(s) for communication so as to optimize its connectivity with the network. Similarly, the AN 320-2 may utilize the spectrum information to assist the UE 320-1 to connect to the identified or selected optimal frequency band(s).

In view of the above, example embodiments of the present disclosure may implement and utilize the sensing functionality (e.g., SF 311-1) such that said sensing functionality may interoperate with the Access Management Function (AMF 311-2) of the telecommunication network system, so as to optimize network resources allocation and utilization, improve the quality of service, and enhance the network performance, according to the sensing information.

Referring still to FIG. 3, in some embodiments, the server node(s) 310 may be configured to utilize the SF 311-1 to communicate with the AN 320-2 and the DN 320-3 via interoperating with the SMF 311-3 and the UPF 312-1.

The data network (DN) 320-3 may include one or more networks, such as 3GPP network(s) and/or non-3GPP network(s), that are involved in data transmission in the telecommunication network ecosystem. For instance, the data network refers to the infrastructure that enables the exchange of data between different entities, such as UE, core network functions, and external networks. This infrastructure includes both the core network (e.g., 3GPP nodes) and non-3GPP networks (external networks accessed through the core network).

Additionally, the data network may also involve non-3GPP networks, such as the internet, private enterprise networks, or other external networks. These non-3GPP networks may be connected to the core network through interworking functions and gateways, allowing data to be exchanged between the core network and external networks.

On the other hand, the Session Management Function (SMF) 311-3 may refer to a network function which is responsible for managing and controlling the session-related aspects of nodes (e.g., UE, etc.) in the network. The key functions of SMF 311-3 may include, for example, session establishment (e.g., allocating of network resources, setting up necessary control and bearer paths, establishing session context, etc.), user plane and control plane separation (e.g., interacting with the Control Plane Function (CPF) to handle control plane signaling and management while delegating the user plane data handling to the User Plane Function (UPF), etc.), policy and quality of service (QoS) enforcement (e.g., enforcing policies and QoS requirements defined by network operators or service providers, ensuring that the appropriate QoS levels are applied to user sessions, ensuring policies related to data usage, traffic management, and service differentiation are enforced, etc.), network slice management (e.g., coordinating the allocation of network resources, policies, and QoS parameters specific to the network slice associated with a particular session, etc.), and the like.

Further, the User Plane Function (UPF) 312-1 may refer to a network function which is responsible for handling the user plane data in the network. The key functions of UPF 312-1 may include, for example, data routing and forwarding (e.g., receiving user data packets from the SMF and routing them to their intended destinations, etc.), providing QoS management (e.g., applying QoS policies and managing the allocation of network resources to meet the specified QoS requirements for user data traffic, controlling the delivery of data packets based on the QoS parameters defined by the SMF 310-3, etc.), performing data processing tasks (e.g., data traffic shaping, data packet inspection, content filtering, etc.), interworking with data networks (e.g., facilitating the interworking and integration with external 3GPP networks and/or non-3GPP networks, handling the adaptation and conversion of protocols, formats, or interfaces to enable seamless communication between the networks, etc.), and the like. The communication among the SMF 310-3 and the UPF 310-4 may be performed via the N4 interface.

In summary, the SMF 311-3 and the UPF 312-1 may be utilized by the server node(s) 310 to establish and manage user sessions, ensure proper QoS enforcement, handle data routing and forwarding, and enable efficient and secure data transmission, such that the sensing data and/or the sensing results may be efficiently communicated among the nodes. The communication among the SF 311-1 and the SMF 311-3 may be performed via a SBI associated with the SMF 311-3 (may be referred to as "SMF interface" or "Nsmf") and/or via a SBI associated with the SF 311-1 (e.g., Nsf). Further, the communication among the SMF 311-3 and the UPF 312-1 may be performed via N4 interface. In addition, the one or more sensing results (which are provided by the SF 311-1 based on the obtained sensing data) may be utilized by the SMF 311-3 and UPF 312-1 to perform one or more operations for enhancing the network performance.

For instance, the server node(s) 310 may be configured to utilize the SF 311-1 to obtain the sensing data from the sensor node(s) (e.g., UE 320-1, AN 320-2, etc.) and to produce the sensing result(s) based on the obtained sensing data. According to embodiments, the sensing result(s) may include information about real-time network conditions, such as network traffic, signal quality, and the like. Accordingly, the server node(s) 310-1 may be configured to execute the SF 311-1 to transmit the sensing result(s) to the SMF 311-3, such that the SMF 311-3 may utilize the aforesaid information to dynamically adjust the QoS parameters, such as priority or bandwidth allocation, for specific sessions. Further, the SMF 311-3 may communicate with the UPF 312-1 to update the QoS settings, so as to ensure that the appropriate QoS requirements are met for the data transmission within the DN 320-3.

As another example, the sensing result(s) may include information associated with changes in network conditions (e.g., changes in signal strength, changes in available network paths, etc.). In this regard, the SMF 311-3 may utilize said information to manage data routing and forwarding. For instance, the SMF 311-3 may communicate with the UPF 312-1 to dynamically adapt the data forwarding path within the DN, ensuring efficient and reliable data transmission based on the network conditions sensed by the SF 311-1.

In view of the above, example embodiments of the present disclosure may implement and utilize the sensing functionality (e.g., SF) such that said sensing functionality may interoperate with the Session Management Function (SMF) and User Plane Function (UPF) of the telecommunication network system, so as to optimize network performance, ensuring efficient resource utilization, and enhancing the network reliability.

In view of the above, example embodiments of the present disclosure may implement the sensing functionalities (e.g., SF, SACF, etc.) to interoperate with one or more network functions of the telecommunication network(s), to thereby enhance the network performance with sensing functionalities or services.

Examples Implementation Environments

As described above, the sensing function (SF/SACF) may be implemented in one or more server nodes, according to one or more embodiments. According to embodiments, the one or more server nodes may include a cloud server or a cloud server cluster, and the sensing function may be implemented in a cloud environment.

Figure 4:
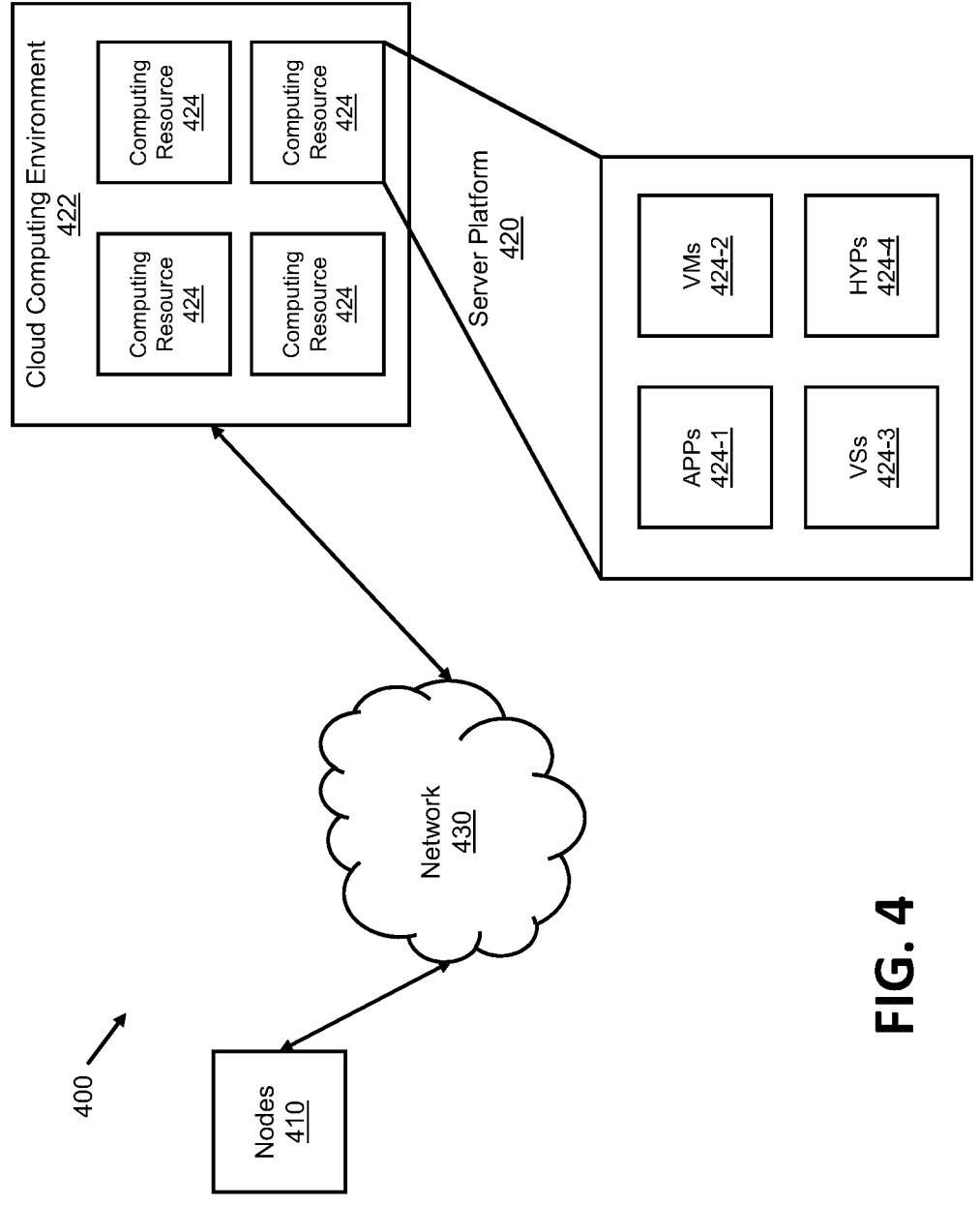
FIG. 4 illustrates a diagram of an example environment in which the sensing function described herein, and the systems and/or methods associated therewith, may be implemented, according to one or more embodiments.

FIG. 4 illustrates a diagram of an example environment 400 in which the sensing function described herein, and the systems and/or methods associated therewith, may be implemented. As shown in FIG. 4, environment 400 may include a plurality of nodes 410, a server platform 420, and a network 430. Devices of environment 400 may interconnect via wired connections, wireless connections, or a combination of wired and wireless connections.

The plurality of nodes 410 may include one or more sensor nodes and one or more utilization parties described hereinabove. Thus, redundant descriptions associated therewith may be omitted below for conciseness.

The server platform 420 includes one or more servers capable of receiving, generating, storing, processing, and/or providing information. Descriptions of example embodiments of the one or more servers are provided below with reference to FIG. 5 to FIG. 7. In some implementations, server platform 420 may include a cloud server or a group of cloud servers. In some implementations, the server platform 420 may be designed to be modular such that certain software components may be swapped in or out depending on a particular need. As such, the server platform 420 may be easily and/or quickly reconfigured for different uses.

In some implementations, as shown, the server platform 420 may be hosted in cloud computing environment 422. Notably, while implementations described herein describe the server platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts the server platform 420. Cloud computing environment 422 may provide computation, software, data access, storage, etc., services that do not require end-user knowledge of a physical location and configuration of system(s) and/or device(s) that hosts the server platform 420. As shown, cloud computing environment 422 may include a group of computing resources 424 (referred to collectively as "computing resources 424" and individually as "computing resource 424").

Computing resource 424 may include one or more personal computers, a cluster of computing devices, workstation computers, server devices, or other types of computation and/or communication devices. In some implementations, the computing resource 424 may host the server platform 420. The cloud resources may include instances computing and executing in the computing resource 424, storage devices provided in the computing resource 424, data transfer devices provided by the computing resource 424, and the like. In some implementations, the computing resource 424 may communicate with other computing resources 424 via wired connections, wireless connections, or a combination of wired and wireless connections.

As further shown in FIG. 4, the computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

The application 424-1 may include one or more software applications that may be provided to or accessed by the nodes 410. The application 424-1 may eliminate the need to install and execute the software applications on the node 410. For example, the application 424-1 may include software associated with the server platform 420 and/or any other software capable of being provided via cloud computing environment 422. In some implementations, one application 424-1 may send/receive information to/from one or more other applications 424-1, via virtual machine 424-2.

The virtual machine 424-2 may include a software implementation of a machine (e.g., a computer) that executes programs like a physical machine. Virtual machine 424-2 may be either a system virtual machine or a process virtual machine, depending upon the use and degree of correspondence to any real machine by the virtual machine 424-2. A system virtual machine may provide a complete system platform that supports the execution of a complete operating system ("OS"). Descriptions of example OSes are provided below with reference to FIG. 7. A process virtual machine may execute a single program, and may support a single process. In some implementations, virtual machine 424-2 may execute on behalf of a user (e.g., user associated with the node(s) 410), and may manage infrastructure and/or configuration of cloud computing environment 422, such as data management, synchronization, or long-duration data transfers.

Virtualized storage 424-3 may include one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. The hypervisor 424-4 may present a virtual operating platform to the guest operating systems, and may manage the execution of the guest operating systems. Multiple instances of a variety of operating systems may share virtualized hardware resources.

Network 430 may include one or more wired and/or wireless networks. For example, network 430 may include a cellular network (e.g., a fifth generation (5G) network, a sixth generation (6G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

According to embodiments, the sensing function (SF/SACF) of example embodiments described herein may be implemented or be deployed in the server platform 420 described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the sensing function (SF/SACF) may be defined or presented in the form of containerized network function, of which the functions may be provided in the form of containers. Descriptions of an example implementation configuration for implementing the sensing function in the form of containerized sensing function are provided below with reference to FIG. 5.

To this end, by virtualizing and implementing the sensing function (SF/SACF) in the server platform 420, which is separated from the nodes 410 (e.g., sensor nodes, etc.), the operations of the sensing function, such as processing, storing, and managing the sensing data and sensing results, can be performed in a separate node from the sensor nodes that obtain the sensing data and from the utilization party which utilizes the sensing results for providing sensing service.

As a result, the power consumption at the sensor nodes may be reduced, which could be particularly advantageous for sensor nodes which are running on an independent power supply (e.g., battery, etc.). Further, the resources for the sensing operations (e.g., processing power, memory, storage, etc.) may be easily managed and be dynamically scaled up or scaled down on demand, which in turn optimize the resource allocation and utilization, and enable the sensing operations, particularly for operations which require inter-operation among multiple sensor nodes and involve complex processing, to be performed efficiently and effectively. Furthermore, since the sensing data and the sensing results are being collectively managed by the sensing function, the sensing data and the sensing results may be easily and securely managed. Furthermore, said sensing data and sensing results may be easily cloned or backup to provide redundancy, and the access of said sensing data and sensing results may be authorized and authenticated to a trusted entity only.

Example Implementation of Containerized Sensing Function

As described above, the sensing function (SF/SACF) may be implemented in the form of a containerized network function, according to one or more embodiments. Below, an example configuration for implementing the containerized sensing function is provided.

Figure 5:
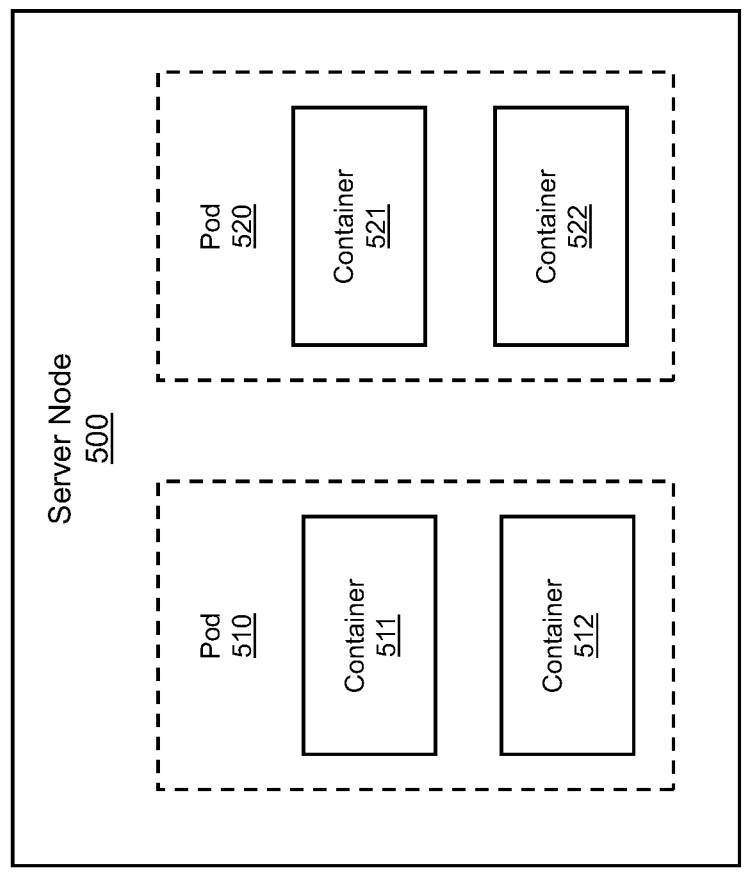
FIG. 5 illustrates a block diagram of a container-based server node, according to one or more embodiments.

FIG. 5 illustrates a block diagram of example components of a server node 500, according to one or more embodiments. Node 500 may correspond to any of the server node(s) of FIG. 1 to FIG. 3 (e.g., node 120-1, etc.), and may be configured to implement the server platform of FIG. 4.

In this example embodiment, the sensing function may be defined in software form via, for example, containerization (or any other suitable technology). Accordingly, the containerized sensing function may be deployed, in the form of containers, in the server node 500, and the functionalities of the sensing function may be performed or be achieved via execution or orchestration of the containers associated with the sensing function.

As illustrated in FIG. 5, the server node 500 may include a plurality of containers 511-512 and 521-522. The containerized sensing function may be disaggregated or scattered among the plurality of containers 511-512 and/or 521-522. For instance, the functionalities of the sensing function may be segregated into Control Plane related functionality and User Plane related functionality, and said Control Plane functionality may be scattered among the containers 511-512 while the User Plane functionality may be scattered among the containers 521-522. Additionally or alternatively, the sensing function may be segregated according to the type of operations, such as operations for receiving sensing data, for processing sensing data, for storing sensing data, or the like, in a similar manner.

According to embodiments, the server node 500 may include a Kubernetes (K8s) node, and the containers of the user plane may be grouped or aggregated in a respective pod (e.g., containers associated with a first function of the sensing function are included in a first pod 510, containers associated with a second function of the sensing function are included in a second pod 520, etc.).

The plurality of pods in the server node 500 may share the same resources (e.g., CPU, memory, etc.) provided by the server node 500. The resources being allocated for the sensing function may be managed by adjusting the pods and/or containers associated with the sensing function. For instance, the resources may be scaled up by increasing the number of containers and/or pods associated therewith, may be scaled down by decreasing the number of containers and/or pods associated therewith, or the like.

It can be understood that the configuration illustrated in FIG. 5 is simplified for descriptive purposes, and is not intended to limit the scope of the present disclosure. Specifically, in practice, the server node 500 may include any suitable components for hosting and executing a plurality of pods, while the number of pods may be greater than two and the number of containers included in each pod may be greater than two, without departing from the scope of the present disclosure. Further, it can be understood that the containerized sensing function may be hosted or deployed in a plurality of nodes, in a similar manner as described above. Furthermore, it can be understood that multiple nodes may include the same containers (or pods) in order to provide network redundancy thereby improving the network availability.

In view of the above, example embodiments of the present disclosure may leverage the advantages of containerization in implementing the sensing function (SF/SACF). For instance, implementing containerized sensing function offer improved scalability, since the sensing function may be efficiently scaled according to demand and may be easily replicated and orchestrated across multiple nodes, thereby enabling efficient resource utilization and seamless scaling.

Further, the containerized sensing function may be quickly instantiated, migrated, and updated, allowing for faster time-to-market for new sensing services and features. Furthermore, the functionalities of the sensing function may be managed by adjusting the associated containers, enabling independent development, testing, and deployment of the sensing function.

In addition, implementing a containerized sensing function may also improve resource utilization efficiency, utilize container-specific security features to improve the system security, provide improved portability and interoperability, and enable seamless integration with different systems or platforms.

Example Components of Server Node

As described above, the sensing function (SF/SACF) may be implemented in one or more server nodes, according to one or more embodiments. Below, descriptions of example components of the server node(s) for implementing the sensing function, as well as an example configuration associated therewith, are provided.

Figure 6:
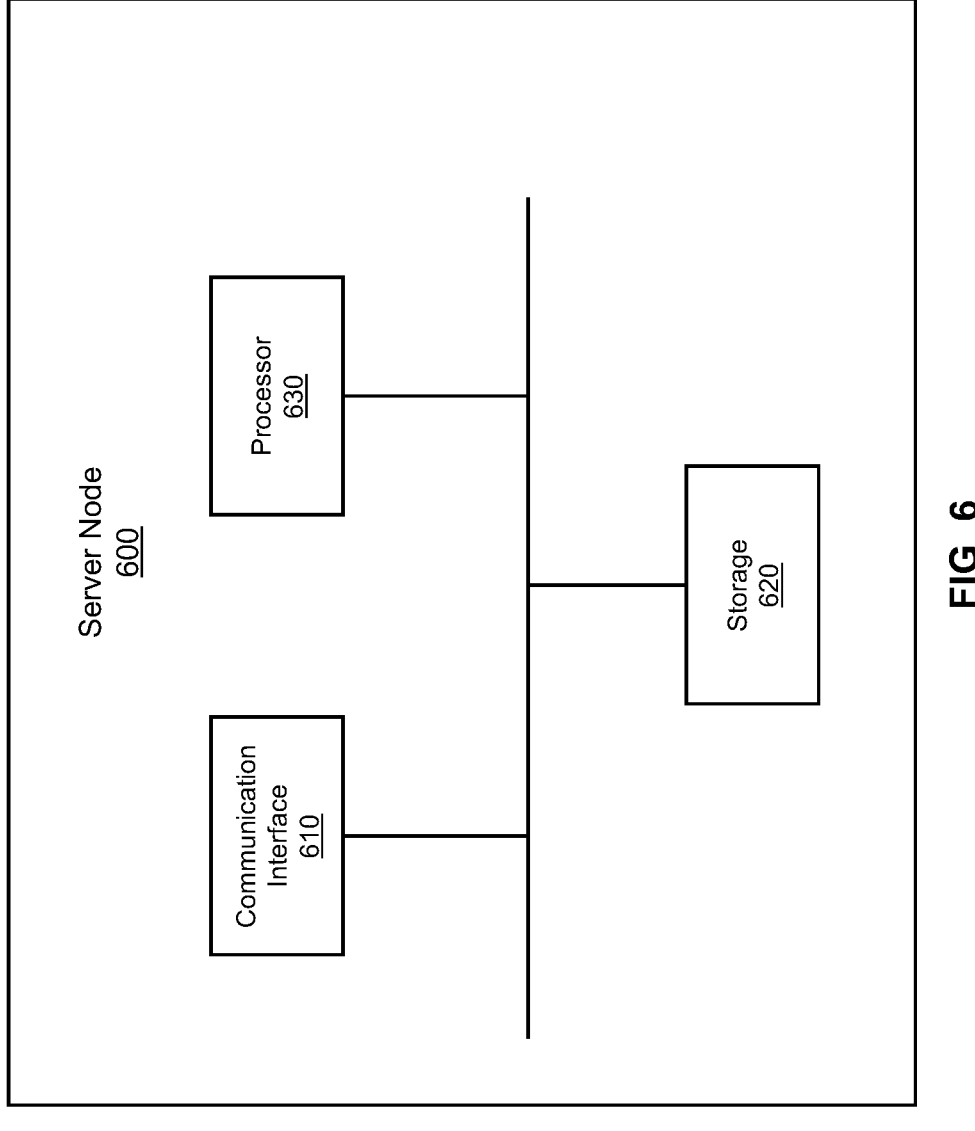
FIG. 6 illustrates a block diagram of an example of general components of a server node, according to one or more embodiments.

FIG. 6 illustrates a block diagram of example components of a server node 600, according to one or more embodiments. Server node 600 may correspond to any of the server node(s) of FIG. 1 to FIG. 3 and FIG. 5, and may be configured to implement the server platform of FIG. 4.

As illustrated in FIG. 6, the server node 600 may include at least one communication interface 610, at least one storage 620, and at least one processor 630, although it can be understood that the server node 600 may include more or less components than as illustrated in FIG. 6, and/or may be arranged in a manner different from as illustrated in FIG. 6, without departing from the scope of the present disclosure.

The communication interface 610 may include at least one transceiver-like component (e.g., a transceiver, a separate receiver and transmitter, a bus, etc.) that enables the components of the server node 600 to communicate with each other and/or to communicate with one or more components external to the server node 600, such as via a wired connection, a wireless connection, or a combination of wired and wireless connections.

For instance, the communication interface 610 may couple the processor 630 to the storage 620 to thereby enable them to communicate and to interoperate with each other in performing one or more operations. As another example, communication interface 610 may couple the server node 600 (or one or more components included therein) to one or more sensor nodes and/or to one or more utilization parties, so as to enable them to communicate and to interoperate with each other.

According to one or more embodiments, the communication interface 610 may include one or more application programming interfaces (APIs) which allow the server node 600 (or one or more components included therein) to communicate with one or more software applications (e.g., software application deployed in the sensor node(s), software application deployed in one or more of the utilization party(s), virtualized network function(s), etc.). Further, the communication interface 610 may include at least one input/output interface, at least one network interface, and at least one storage interface (further described below with reference to FIG. 7).

The storage 620 may include one or more storage mediums suitable for storing data, information, and/or computer-executable instructions therein. According to embodiments, the storage 620 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 630.

Additionally or alternatively, the storage 620 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 620 may be configured to store information, such as raw data, metadata, or the like, obtained from one or more sensor nodes and obtained from one or more utilization parties. Additionally or alternatively, the storage 620 may be configured to store one or more information associated with one or more operations performed by the processor 630. For instance, the storage 620 may store one or more sensing results produced or generated by the at least one processor 630, may store information of nodes involved in the operation(s) performed by the processor 630, information of historical operations performed by the processor 630, or the like.

Further, the storage 620 may store the sensing function (SF/SACF), and one or more information associated therewith (e.g., computer-readable instructions for executing the sensing function, etc.). For instance, the server node 600 may include a cloud server and the sensing function may be defined in the form of a cloud-native application which runs on top of at least one OS in the cloud server. Furthermore, the storage 620 may store executable instructions for implementing one or more network functions described herein, such as NEF, AMF, SMF, UPF, and/or the like, in a similar manner. Furthermore, the storage 620 may include a memory or a storage medium storing a collection of program or database components, such as a user interface, an operating system, a web browser, a mobile application, or the like (further described below with reference to FIG. 7).

In some implementations, the storage 620 may include a plurality of storage mediums, and the storage 620 may be configured to store a duplicate or a copy of at least a portion of the information in the plurality of storage mediums, for providing redundancy and for backing-up the information or the associated data.

The processor 630 may include at least one processor capable of being programmed or being configured to perform a function(s) or an operation(s) described herein. According to embodiments, the processor 630 may be configured to receive (e.g., via the communication interface 610, etc.) one or more signals and/or instructions for triggering the performing of one or more operations. Further, the processor 630 may be implemented in hardware, firmware, or a combination of hardware and software. For instance, the processor 630 may include at least one generic or specialized processing unit, such as at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), an integrated system (bus) controller, a memory management control unit, a floating point unit, a digital signal processing unit, and/or another type of processing or computing unit.

According to embodiments, the processor 630 may be configured to execute the sensing function stored in at least one storage medium or memory storage (e.g., storage 620, etc.) to thereby perform one or more actions or one or more operations described herein. For instance, the processor 630 may execute the sensing function to request, collect, and/or obtain one or more sensing data from one or more sensor nodes (e.g., described above with reference to FIG. 1 to FIG. 4), to process the obtained sensing data to produce or generate one or more sensing results, to store the sensing data and/or the sensing result(s), and to provide the one or more sensing results to one or more utilization parties (e.g., described above with reference to FIG. 1 to FIG. 4). In addition, the processor 630 may be configured to execute the sensing function to interoperate with one or more network functions (e.g., network function(s) of core network of the network system, such as NEF, AMF, SMF, UPF, and the like). According to embodiments, the processor 630 may be configured to execute computer-readable instructions associated with or defining the sensing function, to thereby perform one or more operations defined herein. Descriptions of example operations which may be performed by the processor 630 are provided below with reference to FIG. 8.

Figure 7:
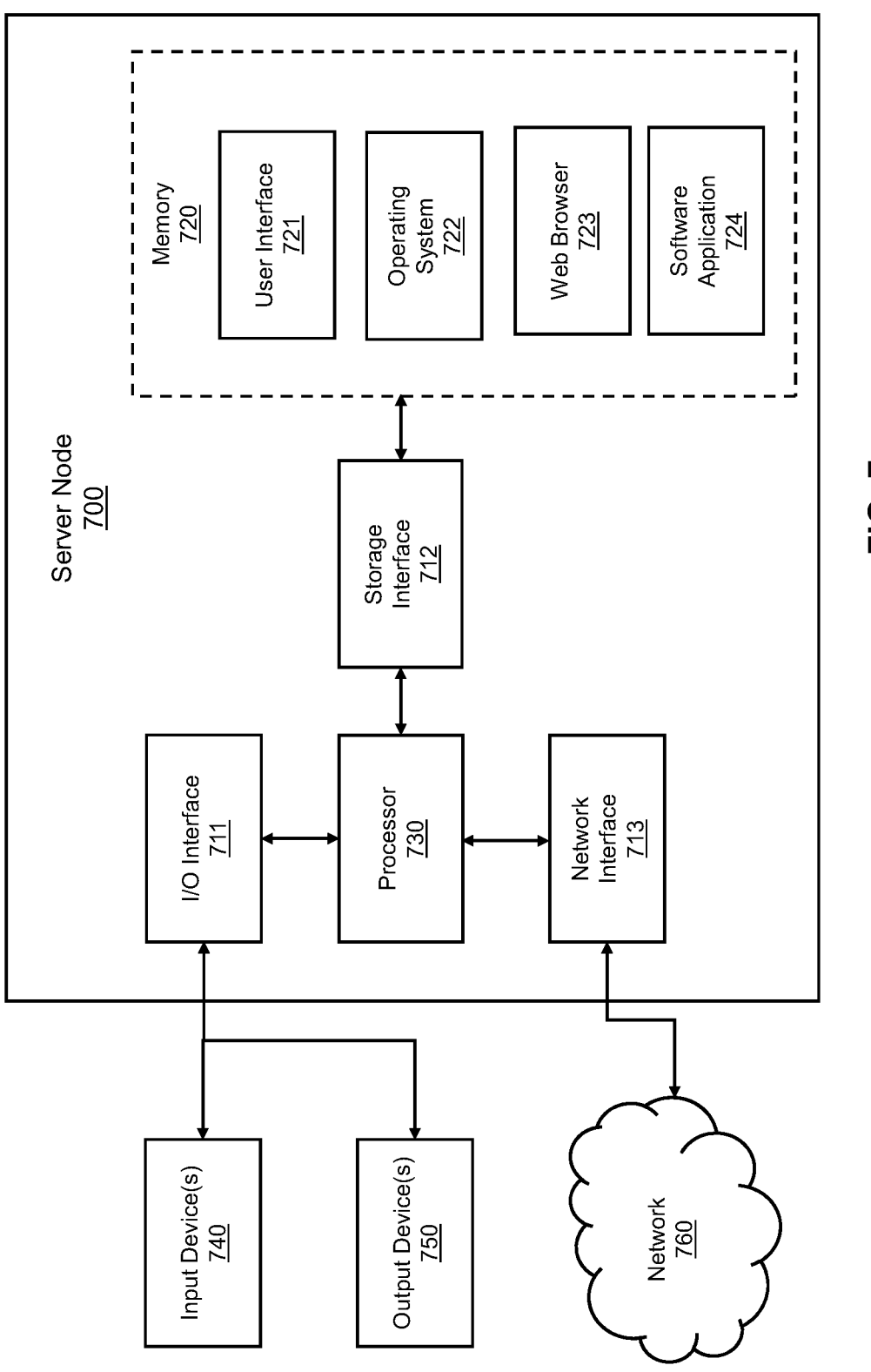
FIG. 7 illustrates a diagram of an example configuration of example components of a server node, according to one or more embodiments.

FIG. 7 illustrates a diagram of an example configuration of example components of a server node 700, according to one or more embodiments. One or more components of the server node 700 may be part of one or more components of the server node 600 in FIG. 6. For instance, the I/O interface 711, the storage interface 712, and the network interface 713 in the server node 700 may be part of the communication interface 610 in the server node 600, the memory 720 in the server node 700 may be part of the storage 620 in the server node 600, and the processor 730 in the server node 700 may be part of the processor 630 in the server node 600. Thus, it can be understood that the features of the server node 600 and the features of the server node 700 described herein may be applicable to each other, unless described otherwise. Further, redundant descriptions associated therewith may be omitted below for conciseness.

Referring to FIG. 7, the processor 730 may be disposed in communication with one or more input devices 740 and one or more output devices 750 via the I/O interface 711. The input device(s) 740 may include devices such as, without limitation, a keyboard, a mouse, a touch screen, sensors, microphones, scanners, a camera, a fingerprint scanner, and the like. The one or more output devices 750 may include devices such as, without limitation, a speaker, an electronic screen, and the like. The I/O interface 711 may employ communication protocols/methods such as, without limitation, audio, analog, digital, stereo, IEEE-1393, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), and the like. Via the I/O interface 711, the server node 700 may communicate with the input device(s) 740 and the output device(s) 750.

In some embodiments, the processor 730 may be disposed in communication with a network 760 via the network interface 713. The network interface 713 may communicatively couple one or more components of the server node 700 to the network 760. The network interface 713 may employ connection protocols including, without limitation, direct connection, Ethernet (e.g., twisted pair 10/100/1000 Base T), Transmission Control Protocol/Internet Protocol (TCP/IP), token ring, IEEE 802.11a/b/g/n/x, etc.

The network 760 may be similar to the network 430 in FIG. 4. Additionally or alternatively, the network 760 may be implemented as one or more of various types of networks, such as intranet or Local Area Network (LAN), Closed Area Network (CAN), and the like. Further, the network 760 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), and the like, to communicate with each other. Further, the network 760 may include a variety of network devices, including routers, bridges, servers, computing devices, storage devices, and the like.

In some embodiments, the processor 730 may be disposed in communication with the memory 720 (e.g., RAM, ROM, or the like, as described above with reference to FIG. 6) via the storage interface 712. The storage interface 712 may connect to memory 720 including, without limitation, memory drives, removable disc drives, and the like, employing connection protocols such as Serial Advanced Technology Attachment (SATA), Integrated Drive Electronics (IDE), IEEE-1393, Universal Serial Bus (USB), fiber channel, Small Computer Systems Interface (SCSI), and the like. The memory drives may further include a drum, magnetic disc drive, magneto-optical drive, optical drive, Redundant Array of Independent Discs (RAID), solid-state memory devices, solid-state drives, and the like. Further descriptions of the memory 720 are provided with reference to the "storage 620" and "computer readable medium" described herein.

The memory 720 may store or deploy a collection of program or database components, including, without limitation, at least one user interface 721, at least one operating system 722, at least one web browser 723, and at least one software application 724. The software application 724 may be associated with the sensing function (SF/SACF) of the present disclosure, which may, upon execution by the processor 730, enable the processor 730 to perform one or more operations associated therewith. In some embodiments, the memory 720 may store user/application data, such as the data, variables, records, and the like, as described herein. Such databases may be implemented as fault-tolerant, relational, scalable, secure databases such as Oracle or Sybase.

The operating system 722 may facilitate resource management and operation of the server node 700. Examples of operating systems may include, without limitation, APPLE® MACINTOSH® OS X®, UNIX®, UNIX-like system distributions (e.g., BERKELEY SOFTWARE DISTRIBUTION® (BSD), FREEBSD®, NETBSD®, OPENBSD, etc.), LINUX® DISTRIBUTIONS (e.g., RED HAT®, UBUNTU®, KUBUNTU®, etc.), IBM®OS/2®, MICROSOFT® WINDOWS® (XP®, VISTA®/7/8, 10, 11, etc.), APPLE® IOS®, GOOGLE™ ANDROID™, BLACK-BERRY® OS, or the like.

The user interface 721 may facilitate display, execution, interaction, manipulation, or operation of program components through textual or graphical facilities. For example, user interfaces may provide computer interaction interface elements on a display system operatively connected to the server node 700, such as cursors, icons, checkboxes, menus, scrollers, windows, widgets, etc. Graphical User Interfaces (GUIs) may be employed, including, without limitation, Apple® Macintosh® operating systems, Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

The web browser 723 may be a hypertext viewing application, such as MICROSOFT® INTERNET EXPLORER®, GOOGLE™, CHROME™, MOZILLA® FIREFOX®, APPLE® SAFARI®, and the like. Secure web browsing may be provided using Secure Hypertext Transport Protocol (HTTPS), Secure Sockets Layer (SSL), Transport Layer Security (TLS), and the like. Web browsers 723 may utilize facilities such as AJAX, DHTML, ADOBE® FLASH®, JAVASCRIPT®, JAVA®, Application Programming Interfaces (APIs), and the like.

In some embodiments, the server node 700 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOB-JECTS®, and the like. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the server node 700 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

To this end, example embodiments of the present disclosure may provide one or more server nodes in which the sensing function (SF/SACF) may be implemented and be deployed. Accordingly, the one or more server nodes (or one or more processors associated therewith) may be configured to execute the sensing function (or computer-executable instructions associated therewith) to perform one or more operations for managing sensing data. Descriptions of several example operations which may be performed by the server node(s) of the present disclosure are provided below with reference to FIG. 8.

Example Operations of Utilizing Sensing Function

As described above, the server node(s) of example embodiments of the present disclosure may utilize or execute the sensing function (SF/SACF) to perform one or more operations. Descriptions of several example operations associated therewith are provided in the following.

Figure 8:
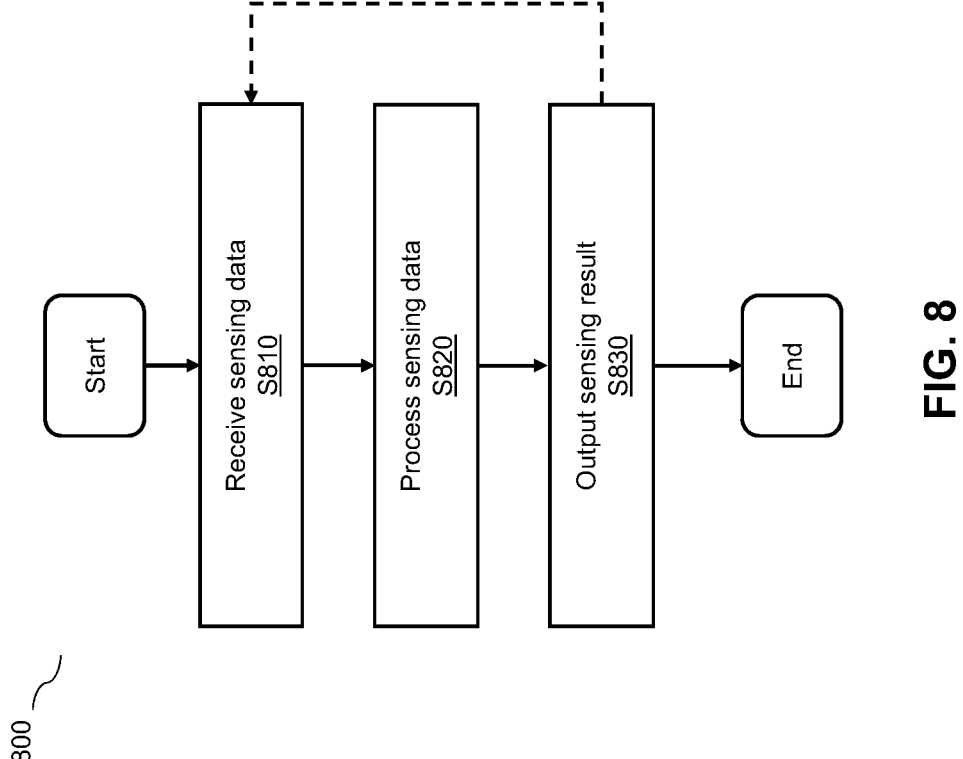
FIG. 8 illustrates a flow diagram of an example method for managing sensing data, according to one or more embodiments.

FIG. 8 illustrates a flow diagram of an example method 800 for managing sensing data, according to one or more embodiments. One or more operations of method 800 may be performed by at least one processor of at least one server node. Specifically, the at least one processor may be configured to utilize or execute a sensing function (e.g., SF/SACF), or computer-readable/computer-executable instructions associated with the sensing function (may be referred to as "instructions for implementing the sensing function" herein), stored in one or more storage mediums, so as to perform said one or more operations.

In general, the at least one processor may execute the sensing function (or instructions associated therewith) to receive one or more sensing data, to process the one or more sensing data to produce one or more sensing results, and to output the one or more sensing results.

Specifically, at operation S810, the at least one processor may receive one or more sensing data from one or more sensor nodes. As described above, the one or more sensor nodes may include one or more user equipment (UEs), one or more access networks (ANs), one or more data networks (DNs), one or more utilization party(s), and any other suitable node or device which may be configured to monitor the surrounding condition and obtain the sensing data therefrom. The one or more sensor nodes may be further categorized into 3GPP sensor nodes and non-3GPP sensor nodes, which are configured to obtain 3GPP sensing data and non-3GPP sensing data, respectively.

According to embodiments, the sensing data may include 3GPP sensing data. Specifically, the sensing data may include information of a signal emitted by the sensor node(s) and information of a responded signal, such as a reflected signal (e.g., reflected version of the emitted signal, etc.), a refracted signal (e.g., refracted version of the emitted signal), a diffracted signal (e.g., diffracted version of the emitted signal, etc.), and the like. For instance, the sensing data may include an angle of emission of the emitted signal, an angle of reflection of the reflected signal, an angle of refraction of the refracted signal, and/or an angle of diffraction of the diffracted signal, a frequency of the emitted signal, the reflected signal, the refracted signal, and/or the diffracted signal, a phase of the emitted signal, the reflected signal, the refracted signal, and/or the diffracted signal, a time-of-flight (ToF) of the emitted signal, the reflected signal, the refracted signal, and/or the diffracted signal, an amplitude of the emitted signal, the reflected signal, the refracted signal, and/or the diffracted signal, and/or the like.

Additionally or alternatively, the sensing data may include information associated with the quality of the emitted signal and the responded signal(s). For instance, the sensing data may include information of: Signal to Noise Ratio (SNR) of the emitted signal, the reflected signal, the refracted signal, and/or the diffracted signal, Signal-to-Interference-plus-Noise Ratio (SINR) of the emitted signal, the reflected signal, the refracted signal, and/or the diffracted signal, signal strength of the emitted signal, Received Signal Strength Indicator (RSSI) of the reflected signal, the refracted signal, and/or the diffracted signal, signal fluctuation (e.g., fading) of the reflected signal, the refracted signal, and/or the diffracted signal, latency of the reflected signal, the refracted signal, and/or the diffracted signal, jitter of the reflected signal, the refracted signal, and/or the diffracted signal, Bit Error Rate (BER) of the reflected signal, the refracted signal, and/or the diffracted signal, and/or the like.

Additionally or alternatively, the sensing data may include non-3GPP sensing data. Specifically, the sensing data may include information associated with an accelerometer (e.g., acceleration of an object, deceleration of the object, etc.), information associated with an image sensor (e.g., image data), information associated with a LiDAR sensor (e.g., light spectrum data), information associated with an audio sensor (e.g., audio data), information associated with a temperature sensor data (e.g., temperature data), information associated with a location sensor (e.g., location data, position data, orientation data), information associated with a contact sensor (e.g., contact data), information associated with an air sensor (e.g., air quality data), and/or the like.

According to embodiments, the at least one processor may receive the sensing data directly from the one or more sensor nodes via an API. Additionally or alternatively, the at least one processor may receive the sensing data via one or more network functions (or one or more components executing said one or more network functions). Specifically, the one or more sensor nodes may obtain one or more sensing data and provide the same to the one or more network functions, and the at least one processor may be configured to communicate with the one or more network functions for receiving the one or more sensing therefrom.

For instance, the sensing data may be provided by a UE and/or a base station (e.g., gNodeB, eNodeB, etc.) to the server node. In this regard, assuming that the UE and/or the base station have not yet established a connection with the server node, the sensing data may first arrive at an access management function (AMF) (or one or more components executing the AMF) along with, for example, an access request (or any other suitable information). Accordingly, the AMF may perform access management (e.g., access authorization, access establishment, etc.) and provide (e.g., via Namf interface, etc.) the sensing data to the at least one processor executing the sensing function upon managing the access.

As another example, assuming that the UE and/or the base station have established a connection with the server node, the UE may transmit the sensing data to the base station, and the base station may transmit (e.g., via N3 interface, etc.) the sensing data to a user plane function (UPF) (or one or more components executing the UPF). Accordingly, the UPF may transmit (e.g., via N4 interface, etc.) the sensing data to the session management function (SMF) (or one or more components executing the SMF), and the SMF may then transmit (e.g., via Nsmf interface, etc.) the sensing data to the at least one processor executing the sensing function.

As yet another example, the sensing data may be provided by one or more nodes communicatively coupled to a data network (DN) associated with the server node. For instance, a device of a trusted third party may be communicatively coupled to the DN via a 3GPP network or a non-3GPP network. In this case, the device may provide the sensing data to the DN, and the DN may route (e.g., via N6 interface, etc.) the sensing data to the UPF (or one or more components executing the UPF). Accordingly, the UPF may transmit (e.g., via the N4 interface, etc.) the sensing data to the SMF (or one or more components executing the SMF), and the SMF may then transmit (e.g., via the Nsmf interface, etc.) the sensing data to the at least one processor executing the sensing function.

According to embodiments, the at least one processor may be configured to continuously (or periodically) execute the sensing function to continuously (or periodically) request for the sensing data from the one or more sensor nodes. For instance, the at least one processor may continuously (or periodically) produce one or more request messages including information of the requested sensing data and may continuously (or periodically) provide said request message(s) to the one or more sensor nodes via one or more API calls. Accordingly, the at least one processor may obtain the latest sensing data in real-time or near real-time. In some implementations, the at least one processor may be configured to receive the one or more sensing data from a plurality of sensor nodes. The plurality of sensor nodes may be deployed or be located in multiple locations which form a sensing area.

It can be understood that the at least one processor may also be configured to obtain the one or more sensing data from the sensor node(s) in any other suitable manner, without departing from the scope of the present disclosure.

Referring still to FIG. 8, upon receiving the one or more sensing data, at operation S820, the at least one processor may be configured to process the one or more sensing data to produce one or more sensing results. For instance, assuming that the one or more sensing data include one or more 3GPP sensing data, the at least one processor may derive, based on the one or more 3GPP sensing data (e.g., signal quality data, etc.), information of one or more network conditions, such as signal quality, spectrum and/or bandwidth availability, potential network interference, area which is having (or have a probability of) network congestion, and/or the like.

According to embodiments, the at least one processor may detect, based on the one or more 3GPP sensing data, an intrusion of an object. Specifically, the at least one processor may compare information of an emitted signal and information of at least one responded signal (e.g., a reflected signal, a refracted signal, a diffracted signal, etc.) to determine a change in the emitted signal.

For instance, the at least one processor may compare an angle of the emitted signal and an angle of the reflected signal, and may determine whether or not the emitted signal has changed by determining whether or not the angle of the emitted signal is different from the angle of the reflected signal. Accordingly, based on determining that the emitted signal has changed, the at least one processor may determine whether or not the changes in the emitted signal satisfy one or more conditions. For instance, the at least one processor may determine whether or not the changes are within a threshold, and/or any other suitable conditions. The one or more conditions may be specified or be defined by the sensing function (SF/SACF). Subsequently, the at least one processor may include the outcomes of the determinations into the one or more sensing results.

As a non-limiting use case, the one or more sensor nodes may be a base station deployed on a road to sense a pedestrian intrusion, may be a UE or a device of a home security system deployed in a house to sense a home intrusion, or the like. In this regard, the one or more sensor nodes may be configured to continuously (or periodically) emit signals to surrounding environment and to continuously (or periodically) measure, detect and obtain information associated with responded signals (e.g., reflected signals, refracted signals, diffracted signals, etc.). The information of the emitted signals and the responded signals may be provided (in the form of sensing data) to the server node, in a similar manner as described above.

Accordingly, the at least one processor of the server node may utilize the sensing function to analyze the sensing data to determine, for example, whether or not the angle of emission of one or more emitted signals is different from the angle of reflection of one or more reflected signals. In this regard, if the angle of the emission of at least one emitted signal is different from the angle of reflection of at least one reflected signal by a certain degree, it indicates that a possible intrusion event has occurred (e.g., a robber may have intruded into the house, a pedestrian or a wild animal may have entered the road, etc.). Subsequently, based on determining that the angles are different from each other, the at least one processor may determine whether or not the differences in said angles are within a threshold value (and/or any other suitable condition) defined by the sensing function, and may include the outcome (e.g., TRUE/FALSE, etc.) into the one or more sensing results.

According to embodiments, the at least one processor may compare the signal quality of one or more emitted signals and the signal quality of one or more reflected signals, and may determine whether or not the one or more emitted signals have changed by determining whether or not the signal quality of the one or more emitted signals is different from the signal quality of the one or more reflected signals. Accordingly, based on determining that the one or more emitted signals have changed, the at least one processor may determine whether or not the changes in the one or more emitted signals satisfy one or more conditions, in a similar manner as described above. The outcomes of the determinations may be included in the one or more sensing results.

As a non-limiting use case, the one or more sensor nodes may be a base station deployed beside a river to sense an event of flooding (or any other suitable event). In this regard, the one or more sensor nodes may be configured to continuously (or periodically) obtain the one or more sensing data from the environment and to continuously (or periodically) provide the one or more sensing data to the server node, in a similar manner as described above.

Accordingly, the at least one processor of the server node may utilize the sensing function to analyze the one or more sensing data to determine whether or not the signal quality of the one or more emitted signals is different from the signal quality of the one or more reflected signals. In this regard, if the signal quality of the one or more emitted signals is different from the signal quality of the one or more reflected signals by a certain degree, it indicates that the signal quality attention may be abnormal and an event (e.g., huge rain, etc.) may have has occurred. Subsequently, based on determining that the signal qualities are different from each other, the at least one processor may determine whether or not the differences are within a threshold value (and/or any other suitable condition) defined by the sensing function, and may include the outcome (e.g., TRUE/FALSE, etc.) into the one or more sensing results.

According to embodiments, the one or more sensing data received by the at least one processor (at operation S810)

may include both 3GPP sensing data and non-3GPP sensing data. In this regard, the at least one processor may produce the one or more sensing results based on the 3GPP sensing data and the non-3GPP sensing data. For instance, the at least one processor may combine the 3GPP sensing data with the non-3GPP sensing data to produce a combined sensing dataset, and may analyze the combined sensing dataset to thereby produce one or more combined sensing results. As another example, the at least one processor may produce one or more sensing results based on one of the 3GPP sensing data and the non-3GPP sensing data, and may utilize the another one of the 3GPP sensing data and the non-3GPP sensing data to verify and/or to enhance the produced one or more sensing results. As yet another example, the at least one processor may combine a first portion of one of the 3GPP sensing data and the non-3GPP sensing data to produce a combined sensing dataset, may analyze the combined sensing dataset to produce one or more combined sensing results, and may utilize a second portion of the another one of the 3GPP sensing data and the non-3GPP sensing data to verify and/or to enhance the produced one or more combined sensing results. It can be understood that the at least one processor may also process the 3GPP sensing data and/or the non-3GPP sensing data to produce the one or more sensing results in any other suitable manner, without departing from the scope of the present disclosure.

By way of example, in the use case of flooding event sensing, the at least one processor may combine the 3GPP sensing data with non-3GPP sensing data, such as data from a humidity sensor, a pressure sensor, an acoustic rain sensor, and the like, to produce a combined sensing dataset, and may thereby process the combined sensing dataset to produce the sensing result(s) for determining the flooding event therefrom. Further, the at least one processor may verify the produced sensing result(s) in a similar manner as described above.

Referring still to FIG. 8, upon processing the one or more sensing data and generating the one or more sensing results, at operation S830, the at least one processor of the server node may be configured to execute the sensing function to output the one or more sensing results. For instance, the at least one processor may execute the sensing function to determine one or more target nodes or one or more target locations to which the one or more sensing results should be transmitted, and may transmit the one or more sensing results to the respective target node(s) or the target location(s). The target node(s)/target location(s) may include, for example, one or more utilization parties (e.g., one or more trusted third parties, one or more UEs, one or more network functions, etc.).

According to embodiments, the at least one processor may directly transmit the one or more sensing results to the target node(s)/target location(s) via an API. Additionally or alternatively, the at least one processor may output the one or more sensing results to one or more network functions (or one or more components executing said one or more network functions).

For instance, the at least one processor may provide (e.g., via the Nsf interface, etc.) the one or more sensing results to one or more of the NEF, AMF, and SMF (or one or more components executing said network functions), and said network functions may appropriately route the one or more sensing results to the respective target node(s)/target location(s). By way of example, assuming that the target node(s)/target location(s) is associated with a trusted third party, the at least one processor may provide the one or more sensing results to the NEF (or one or more components executing the NEF), and the NEF may appropriately and securely transmit the one or more sensing results to the trusted third party. Similarly, the at least one processor may provide the one or more sensing results to the AMF (or one or more components executing the AMF), and the AMF may transmit the one or more sensing results to a target UE, a target AN, and the like. Furthermore, the at least one processor may provide the one or more sensing results to the SMF (or one or more components executing the AMF), and the SMF may transmit the one or more sensing results to the UPF (or one or more components executing the UPF). Subsequently, the UPF may forward the one or more sensing results to a target AN, a target DN, and the like.

According to embodiments, the at least one processor may register and may continuously (or periodically) update information of the sensing function (SF/SACF), such as functionalities, capabilities, and the like, with a network repository function (NRF). Accordingly, the one or more network functions (e.g., NEF, AMF, SMF, etc.) may discover the sensing function (or one or more information associated therewith) via utilizing NRF discovery mechanism. For instance, said one or more network functions may continuously (or periodically) send a request to the NRF for requesting for latest information associated with the sensing function. In response, the NRF may provide the requested information to the one or more network functions. In this way, the one or more network functions may discover and communicate with the sensing function for communicating one or more sensing data and/or one or more sensing results. In this regard, the one or more network functions may continuously (or periodically) send, via the respective interface (e.g., the respective SBI, etc.), a request for the one or more sensing results to the at least one processor executing the sensing function. Accordingly, the at least one processor may, in response to the request, provide (e.g., via the Nsf interface, etc.) the one or more sensing results to the one or more network functions.

Upon outputting the one or more sensing results, the method 800 may be ended. Alternatively, the method 800 may return to operation S810, such that the at least one processor of the server node may perform operations S810-S830 again, for at least a period of time. In this way, the at least one processor may continuously (or periodically) receive one or more updated sensing data, process the one or more updated sensing data to produce one or more updated sensing results, and output the one or more updated sensing results.

It can be understood that the features described above are merely a portion of possible embodiments, and are not intended to be exhaustive or to limit the scope of the present disclosure. Specifically, the at least one processor may be configured to utilize the sensing function to communicate the one or more sensing data and the one or more sensing functions with any other suitable network functions in any other suitable manner, without departing from the scope of the present disclosure.

To this end, examples embodiments of the present disclosure provide a server node with a sensing function deployed or hosted therein as a dedicated network function for managing sensing related processes and tasks. Accordingly, the server node (or the at least one processor associated therewith) may, upon utilizing the sensing function (or instructions associated therewith), communicate with one or more sensor nodes to obtain one or more sensing data and to process the one or more sensing data to thereby produce one or more sensing results. Accordingly, further operations or actions may be taken based on the one or more sensing results.

For instance, based on sensing a home intrusion event, the one or more sensing results may be provided to a security authority. As another example, based on sensing a pedestrian or a wild animal intruding on a road, the one or more sensing results may be provided to a vehicle nearby the road to alert the driver. Further non-limiting example use cases may include rainfall monitoring, sensing flooding, sensing for tourist spot traffic management, sensing contactless sleep monitoring service, automotive driving assistance and navigation, and the like.

In addition to sensing services, the network performance of the telecommunication system may also be improved, be enhanced, or be further developed. For instance, the one or more sensing results may be utilized for optimizing bandwidth/spectrum selection and utilization, for providing accurate beamforming, for enabling fast beam failure recovery, for achieving less overhead to track the channel state information (CSI), and the like.

Various Aspects of Embodiments

It is contemplated that the example embodiments described hereinabove with reference to FIG. 1 to FIG. 8 are merely examples of possible embodiments of the present disclosure, and are not intended to limit or restrict the scope of the present disclosure.

Specifically, the foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a device (e.g., server node, etc.), a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limited to the implementations. Thus, the operation and behavior of the systems and/or methods were described herein without reference to specific software code—it is understood that software and hardware may be designed to implement the systems and/or methods based on the description herein.

In view of the above, various further respective aspects and features of embodiments of the present disclosure may be defined by the following items:

Item [1]: A system including: at least one sensor node configured to obtain one or more sensing data and to provide the one or more sensing data to one or more network functions, wherein the at least one sensor node may include at least one 3GPP node, at least one non-3GPP node, or a combination thereof; and at least one server node including: a memory storage storing instructions for implementing a sensing function; and at least one processor communicatively coupled to the memory storage, wherein the at least one processor may be configured to execute the instructions to: receive, from the one or more network functions, the one or more sensing data; process the one or more sensing data to produce one or more sensing results; and output, to the one or more network functions, the one or more sensing results.

Item [2]: The system according to item [1], wherein the at least one 3GPP sensor node may include at least one 3GPP-based user equipment (UE), a 3GPP-based base station, or a combination thereof.

Item [3]: The system according to any one of items [1]-[2], wherein the at least one non-3GPP sensor node may include a non-3GPP-based UE, an accelerometer, an image sensor, an audio sensor, a radar, a camera, a temperature sensor, a location sensor, a contact sensor, an air sensor, or a combination thereof.

Item [4]: The system according to any one of items [1]-[3], wherein the at least one server node may include an edge server.

Item [5]: The system according to any one of items [1]-[4], wherein the one or more network functions may include one or more of: a Network Exposure Function (NEF), an Access and Mobility Management Function (AMF), Session Management Function (SMF), and a User Plane Function (UPF).

Item [6]: The system according to any one of items [1]-[5], wherein the system may include at least two server nodes, wherein a first server node of the at least two server nodes may include the sensing function, and wherein a second server node of the at least two server nodes may include the one or more network functions.

Item [7]: The system according to any one of items [1]-[6], wherein the one or more sensing data may include information associated with an emitted signal and information associated with a responded signal, and wherein the responded signal may include one or more of: a reflected signal, a refracted signal, and a diffracted signal.

Item [8]: The system according to item [7], wherein the one or more sensing data may include one or more of: an angle of emission of the emitted signal, an angle of reflection of the reflected signal, an angle of refraction of the refracted signal, an angle of diffraction of the diffracted signal, a frequency of the emitted signal, a frequency of the reflected signal, a frequency of the refracted signal, a frequency of the diffracted signal, a phase of the emitted signal, a phase of the reflected signal, a phase of the refracted signal, a phase of the diffracted signal, a time-of-flight (ToF) of the emitted signal, a ToF of the reflected signal, a ToF of the refracted signal, a ToF of the diffracted signal, an amplitude of the emitted signal, an amplitude of the reflected signal, an amplitude of the refracted signal, and an amplitude of the diffracted signal.

Item [9]: The system according to any one of items [7]-[8], wherein the one or more sensing data may include one or more of: Signal to Noise Ratio (SNR) of the emitted signal, SNR of the reflected signal, SNR of the refracted signal, SNR of the diffracted signal, Signal-to-Interference-plus-Noise Ratio (SINR) of the emitted signal, SINR of the reflected signal, SINR of the refracted signal, SINR of the diffracted signal, signal strength of the emitted signal, Received Signal Strength Indicator (RSSI) of the reflected signal, RSSI of the refracted signal, RSSI of the diffracted signal, signal fluctuation of the reflected signal, signal fluctuation the refracted signal, signal fluctuation the diffracted signal, latency of the reflected signal, latency of the refracted signal, latency of the diffracted signal, jitter of the reflected signal, jitter of the refracted signal, jitter of the diffracted signal, Bit Error Rate (BER) of the reflected signal, BER of the refracted signal, and BER of the diffracted signal.

Item [10]: The system according to any one of items [7]-[9], wherein the at least one processor of the at least one server node may be configured to execute the instructions to process the one or more sensing data by: comparing the information of the emitted signal to the information of the reflected signal to determine a change in the emitted signal; based on determining that the emitted signal has changed, determining whether or not the change in the emitted signal satisfies one or more conditions; and generating the one or more sensing results based on the outcomes of the determinations.

Item [11]: A method, performed by at least one processor of at least one server node of a system upon executing instructions for implementing a sensing function, including: receiving, from one or more network functions, one or more sensing data, wherein the one or more sensing data may be provided to the one or more network functions by at least one sensor node, wherein the at least one sensor node may include at least one 3GPP node, at least one non-3GPP node, or a combination thereof; processing the one or more sensing data to produce one or more sensing results; and outputting, to the one or more network functions, the one or more sensing results.

Item [12]: The method according to item [11], wherein the at least one 3GPP sensor node may include at least one 3GPP-based user equipment (UE), a 3GPP-based base station, or a combination thereof.

Item [13]: The method according to any one of items [11]-[12], wherein the at least one non-3GPP sensor node may include a non-3GPP-based UE, an accelerometer, an image sensor, an audio sensor, a radar, a camera, a temperature sensor, a location sensor, a contact sensor, an air sensor, or a combination thereof.

Item [14]: The method according to any one of items [11]-[13], wherein the at least one server node may include an edge server.

Item [15]: The method according to any one of items [11]-[14], wherein the one or more network functions include one or more of: a Network Exposure Function (NEF), an Access and Mobility Management Function (AMF), Session Management Function (SMF), and a User Plane Function (UPF).

Item [16]: The method according to any one of items [11]-[15], wherein the system may include at least two server nodes, wherein a first server node of the at least two server nodes may include the sensing function, and wherein a second server node of the at least two server nodes may include the one or more network functions.

Item [17]: The system according to any one of items [11]-[16], wherein the one or more sensing data may include information associated with an emitted signal and information associated with a responded signal, and wherein the responded signal may include one or more of: a reflected signal, a refracted signal, and a diffracted signal.

Item [18]: The method according to item [17], wherein the one or more sensing data may include one or more of: an angle of emission of the emitted signal, an angle of reflection of the reflected signal, an angle of refraction of the refracted signal, an angle of diffraction of the diffracted signal, a frequency of the emitted signal, a frequency of the reflected signal, a frequency of the refracted signal, a frequency of the diffracted signal, a phase of the emitted signal, a phase of the reflected signal, a phase of the refracted signal, a phase of the diffracted signal, a time-of-flight (ToF) of the emitted signal, a ToF of the reflected signal, a ToF of the refracted signal, a ToF of the diffracted signal, an amplitude of the emitted signal, an amplitude of the reflected signal, an amplitude of the refracted signal, and an amplitude of the diffracted signal.

Item [19]: The method according to any one of items [17]-[18], wherein the one or more sensing data may include one or more of: Signal to Noise Ratio (SNR) of the emitted signal, SNR of the reflected signal, SNR of the refracted signal, SNR of the diffracted signal, Signal-to-Interference-plus-Noise Ratio (SINR) of the emitted signal, SINR of the reflected signal, SINR of the refracted signal, SINR of the diffracted signal, signal strength of the emitted signal, Received Signal Strength Indicator (RSSI) of the reflected signal, RSSI of the refracted signal, RSSI of the diffracted signal, signal fluctuation of the reflected signal, signal fluctuation the refracted signal, signal fluctuation the diffracted signal, latency of the reflected signal, latency of the refracted signal, latency of the diffracted signal, jitter of the reflected signal, jitter of the refracted signal, jitter of the diffracted signal, Bit Error Rate (BER) of the reflected signal, BER of the refracted signal, and BER of the diffracted signal.

Item [20]: The system according to any one of items [17]-[19], wherein the processing the one or more sensing data may include: comparing the information of the emitted signal to the information of the reflected signal to determine a change in the emitted signal; based on determining that the emitted signal has changed, determining whether or not the change in the emitted signal satisfies one or more conditions; and generating the one or more sensing results based on the outcomes of the determinations.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
at least one sensor node configured to obtain one or more sensing data and to provide the one or more sensing data to one or more network functions, wherein the at least one sensor node comprises at least one 3GPP node, at least one non-3GPP node, or a combination thereof; and
at least one server node comprising:
a memory storage storing instructions for implementing a sensing function; and
at least one processor communicatively coupled to the memory storage, wherein the at least one processor is configured to execute the instructions to:
receive, from the one or more network functions, the one or more sensing data;
process the one or more sensing data to produce one or more sensing results; and
output, to the one or more network functions, the one or more sensing results,
wherein the at least one processor of the at least one server node is configured to execute the instructions to process the one or more sensing data by performing processing with respect to information associated with an emitted signal emitted by the sensor node and information associated with a responded signal corresponding to the emitted signal, to determine whether there is a change in the emitted signal.

2. The system according to claim 1, wherein the at least one 3GPP sensor node comprises at least one 3GPP-based user equipment (UE), a 3GPP-based base station, or a combination thereof.

3. The system according to claim 1, wherein the at least one non-3GPP sensor node comprises a non-3GPP-based UE, an accelerometer, an image sensor, an audio sensor, a radar, a camera, a temperature sensor, a location sensor, a contact sensor, an air sensor, or a combination thereof.

4. The system according to claim 1, wherein the at least one server node comprises an edge server.

5. The system according to claim 1, wherein the one or more network functions comprises one or more of: a Network Exposure Function (NEF), an Access and Mobility Management Function (AMF), Session Management Function (SMF), and a User Plane Function (UPF).

6. The system according to claim 1, wherein the system comprises at least two server nodes, wherein a first server node of the at least two server nodes comprises the sensing function, and wherein a second server node of the at least two server nodes comprises the one or more network functions.

7. The system according to claim 1, wherein the one or more sensing data comprises information associated with the emitted signal and information associated with the responded signal, and wherein the responded signal comprises one or more of: a reflected signal, a refracted signal, and a diffracted signal.

8. The system according to claim 7, wherein the one or more sensing data comprises one or more of: an angle of emission of the emitted signal, an angle of reflection of the reflected signal, an angle of refraction of the refracted signal, an angle of diffraction of the diffracted signal, a frequency of the emitted signal, a frequency of the reflected signal, a frequency of the refracted signal, a frequency of the diffracted signal, a phase of the emitted signal, a phase of the reflected signal, a phase of the refracted signal, a phase of the diffracted signal, a time-of-flight (ToF) of the emitted signal, a ToF of the reflected signal, a ToF of the refracted signal, a ToF of the diffracted signal, an amplitude of the emitted signal, an amplitude of the reflected signal, an amplitude of the refracted signal, and an amplitude of the diffracted signal.

9. The system according to claim 7, wherein the one or more sensing data comprises one or more of: Signal to Noise Ratio (SNR) of the emitted signal, SNR of the reflected signal, SNR of the refracted signal, SNR of the diffracted signal, Signal-to-Interference-plus-Noise Ratio (SINR) of the emitted signal, SINR of the reflected signal, SINR of the refracted signal, SINR of the diffracted signal, signal strength of the emitted signal, Received Signal Strength Indicator (RSSI) of the reflected signal, RSSI of the refracted signal, RSSI of the diffracted signal, signal fluctuation of the reflected signal, signal fluctuation the refracted signal, signal fluctuation the diffracted signal, latency of the reflected signal, latency of the refracted signal, latency of the diffracted signal, jitter of the reflected signal, jitter of the refracted signal, jitter of the diffracted signal, Bit Error Rate (BER) of the reflected signal, BER of the refracted signal, and BER of the diffracted signal.

10. The system according to claim 7, wherein the at least one processor of the at least one server node is configured to execute the instructions to process the one or more sensing data by:
comparing the information of the emitted signal to the information of the reflected signal to determine a change in the emitted signal;
based on determining that the emitted signal has changed, determining whether or not the change in the emitted signal satisfies one or more conditions; and
generating the one or more sensing results based on the outcomes of the determinations.

11. A method, performed by at least one processor of at least one server node of a system upon executing instructions for implementing a sensing function, comprising:

receiving, from one or more network functions, one or more sensing data, wherein the one or more sensing data are provided to the one or more network functions by at least one sensor node, wherein the at least one sensor node comprises at least one 3GPP node, at least one non-3GPP node, or a combination thereof;

processing the one or more sensing data to produce one or more sensing results; and outputting, to the one or more network functions, the one or more sensing results, wherein the processing the one or more sensing data comprises performing processing with respect to information associated with an emitted signal emitted by the sensor node and information associated with a responded signal corresponding to the emitted signal, to determine whether there is a change in the emitted signal.

12. The method according to claim 11, wherein the at least one 3GPP sensor node comprises at least one 3GPP-based user equipment (UE), a 3GPP-based base station, or a combination thereof.

13. The method according to claim 11, wherein the at least one non-3GPP sensor node comprises a non-3GPP-based UE, an accelerometer, an image sensor, an audio sensor, a radar, a camera, a temperature sensor, a location sensor, a contact sensor, an air sensor, or a combination thereof.

14. The method according to claim 11, wherein the at least one server node comprises an edge server.

15. The method according to claim 11, wherein the one or more network functions comprises one or more of: a Network Exposure Function (NEF), an Access and Mobility Management Function (AMF), Session Management Function (SMF), and a User Plane Function (UPF).

16. The method according to claim 11, wherein the system comprises at least two server nodes, wherein a first server node of the at least two server nodes comprises the sensing function, and wherein a second server node of the at least two server nodes comprises the one or more network functions.

17. The method according to claim 11, wherein the one or more sensing data comprises information associated with the emitted signal and information associated with the responded signal, and wherein the responded signal comprises one or more of: a reflected signal, a refracted signal, and a diffracted signal.

18. The method according to claim 17, wherein the one or more sensing data comprises one or more of: an angle of emission of the emitted signal, an angle of reflection of the reflected signal, an angle of refraction of the refracted signal, an angle of diffraction of the diffracted signal, a frequency of the emitted signal, a frequency of the reflected signal, a frequency of the refracted signal, a frequency of the diffracted signal, a phase of the emitted signal, a phase of the reflected signal, a phase of the refracted signal, a phase of the diffracted signal, a time-of-flight (ToF) of the emitted signal, a ToF of the reflected signal, a ToF of the refracted signal, a ToF of the diffracted signal, an amplitude of the emitted signal, an amplitude of the reflected signal, an amplitude of the refracted signal, and an amplitude of the diffracted signal.

19. The method according to claim 17, wherein the one or more sensing data comprises one or more of: Signal to Noise Ratio (SNR) of the emitted signal, SNR of the reflected signal, SNR of the refracted signal, SNR of the diffracted signal, Signal-to-Interference-plus-Noise Ratio (SINR) of the emitted signal, SINR of the reflected signal, SINR of the refracted signal, SINR of the diffracted signal, signal strength of the emitted signal, Received Signal Strength Indicator (RSSI) of the reflected signal, RSSI of the refracted signal, RSSI of the diffracted signal, signal fluctuation of the reflected signal, signal fluctuation the refracted signal, signal fluctuation the diffracted signal, latency of the reflected signal, latency of the refracted signal, latency of the diffracted signal, jitter of the reflected signal, jitter of the refracted signal, jitter of the diffracted signal, Bit Error Rate (BER) of the reflected signal, BER of the refracted signal, and BER of the diffracted signal.

20. The method according to claim 17, wherein the processing the one or more sensing data comprises:

comparing the information of the emitted signal to the information of the reflected signal to determine a change in the emitted signal;

based on determining that the emitted signal has changed, determining whether or not the change in the emitted signal satisfies one or more conditions; and generating the one or more sensing results based on the outcomes of the determinations.

* * * * *